United States Patent [19]

Matsumoto

[11] Patent Number: 5,285,378
[45] Date of Patent: Feb. 8, 1994

[54] APPARATUS FOR AND METHOD OF AUTOMATICALLY TUNING AND SETTING CONTROL PARAMETERS FOR A NUMERICAL CONTROL UNIT

[75] Inventor: Kouki Matsumoto, Aichi, Japan

[73] Assignee: Mitsubishi Denki K.K., Tokyo, Japan

[21] Appl. No.: 860,314

[22] Filed: Mar. 30, 1992

[30] Foreign Application Priority Data

Mar. 29, 1991 [JP] Japan .................. 3-066486

[51] Int. Cl.$^5$ ............................................. G05B 13/04
[52] U.S. Cl. ............................... 364/157; 364/474.15;
364/578; 364/178
[58] Field of Search ............... 364/157, 162, 474.15,
364/578, 581, 178; 318/561

[56] References Cited

U.S. PATENT DOCUMENTS

| | | | |
|---|---|---|---|
| 3,829,750 | 8/1974 | Centner et al. | 364/474.15 |
| 4,408,280 | 10/1983 | Bedini et al. | 364/474.15 |
| 4,607,326 | 8/1986 | Mori et al. | 364/162 |
| 4,609,855 | 9/1986 | Andrews | 318/561 |
| 4,669,040 | 5/1987 | Pettit et al. | 364/162 |

FOREIGN PATENT DOCUMENTS 2-83703  3/1990  Japan .................. G05B 13/00

Primary Examiner—Jerry Smith
Assistant Examiner—Paul Gordon
Attorney, Agent, or Firm—Sughrue, Mion, Zinn, Macpeak & Seas

[57] ABSTRACT

An apparatus for and method of automatically tuning control parameters of a servo or spindle drive system controlled by a numerical control unit is disclosed. The numerical control unit employs an automatic tuning device that automatically selects a tuning program and test run program associated with a selected control parameter. The tuning device test runs the servo or spindle according to the test run program selected and changes and controls the status value data measured in accordance with the control parameter selected. The invention also relates to a method of changing a criterion for the feature values of a control parameter, a method of comprehensively determining the feature values where there are a plurality of tuning conditions, and a method of sampling the status value data of the servo or spindle.

10 Claims, 20 Drawing Sheets

FIG. 5

AUTOMATIC TUNING MENU SCREEN

AUTO TUNING MODE (AUTO TUNING MENU)

SELECT ANY OF THE FOLLOWING ITEMS:

| NO. | ITEM | DESCRIPTION | PARAMETER TUNED |
|---|---|---|---|
| 1 | ALL | AUTOMATICALLY TUNED ACCORDING TO TUNING MATRIX SETTING | PARAMETER NO. 2-6 |
| 2 | Y_LOOP | VELOCITY LOOP SYSTEM PARAMETER IS AUTOMATICALLY TUNED. | YGH, YIA, FHZ, FGH, XJL |
| 3 | P_LOOP | POSITION LOOP SYSTEM PARAMETER IS AUTOMATICALLY TUNED. | PGN, GO1L, GI1L, FFG |
| 4 | LOST | COMPENSATION PARAMETER FOR SALIENT VALUE AT QUADRANT SWITCHING TIME IS AUTOMATICALLY TUNED | LHC, LHT |
| 5 | CLOSED | PREVENTS POSITION OVERSHOOT AND POOLED DATA FEED IN FULL CLOSED LOOP | YIL |
| 6 | DUAL | OPTIMALLY SETS DUAL FEEDBACK SYSTEM CONTROL SYSTEM | DFT, DFM |

| ALL | Y_LOOP | P_LOOP | LOST | CLOSED | DUAL | | EXIT |

```
G91  G28  X ;
G00  X10 .;
G94  G04  X2000 ;
G00  X-10 ;
%
```

```
G91  G28  X ;
G00  X50. ;
G94  G04  X1000 ;
G00  X-50. ;
%
```

$$\begin{cases} j=0 \ (f<0) \\ j=W \ (0\leq f< \frac{10-b}{a}) \\ j=af-b \ (\frac{10-b}{a}\leq f<-\frac{b}{a}) \\ j=0 \ (f\geq -\frac{b}{a}) \end{cases}$$

APPARATUS FOR AND METHOD OF AUTOMATICALLY TUNING AND SETTING CONTROL PARAMETERS FOR A NUMERICAL CONTROL UNIT

BACKGROUND OF THE INVENTION

1. Field of the Invention

The present invention is directed to the field of numerical control units for controlling multiple axis machine tools or the like. More specifically, the present invention is directed to an apparatus for and method of automatically tuning and setting control parameters that define the accuracy of movement of a servo or spindle motor drive system that is controlled by a numerical control unit. The present invention also relates to a process for changing criteria for feature values of a control parameter, a process for comprehensively determining the feature values where there are a plurality of tuning conditions, and a process for sampling the status value data of the servo or spindle.

2. Description of the Prior Art

A known prior art numerical control unit for controlling a servo or spindle motor drive system is illustrated in FIG. 26. The numerical control unit 1C controls the servo or spindle motor 3 via a servo or spindle amplifier 2C. The numerical control unit 1C is controlled by a control section 6C that outputs position and velocity commands generated by a position/velocity command generator 7C for generating a motor position or velocity command value according to a machining program. These commands are transmitted to the servo or spindle amplifier 2C via an interface 10C.

A control parameter storage device 8C stores the control parameters of the servo or spindle motor drive system. These parameters and other information are both transmitted to and received from the servo or spindle amplifier 2C. The numerical control unit is coupled to an operation board 5 having a cathode ray tube (CRT) screen 25 for displaying internal data of the numerical control unit 1C. A keyboard 26 mounted on the operation board 5 transmits data input by an operator to the numerical control unit 1C via the input/output (I/O) control section 11. A synchroscope 41 allows the operator to monitor the internal data of servo or spindle amplifier 2C by receiving information converted by a digital-to-analog (D/A) converter 40. The spindle amplifier receives position and velocity commands, and information such as control parameters, from the numerical control unit 1C via an amplifier interface 28. Such information is used by a motor drive control section 27 for controlling the parameters such as current, position, velocity, and the like of the motor 3 and a corresponding machine element.

FIG. 27 illustrates a flow chart of the procedure used in the prior art system described above when the operator tunes the control parameters. In the beginning of the procedure, the operator checks the initial settings of the control parameters on the CRT screen 25 of the operation board 5 (S81). The operator then conducts a test run to obtain the necessary information for tuning the parameters (S82). During the test run, the operator monitors the data displayed on the CRT screen 25, or the data shown on the synchroscope 41 in the form of a waveform (S83). The operator then determines whether the control parameters are appropriate or not on the basis of such data (S84). When the data is determined to be appropriate, the tuning is terminated. When the data, however, is deemed to be inappropriate, the operator enters a new control parameter value from the keyboard 26 (S85), and repeats steps S82 through S84 until the control parameter is determined to be appropriate.

With reference to FIGS. 28(a) and 28(b), a method of tuning a position command will now be described. When a position command, shown as signal waveform (i) in FIG. 28(a), is issued, the servo response is delayed, as indicated by waveforms (ii) through (iv). In particular, when the control parameter setting is improper, the response delay approximates the signal waveform (iv). To tune this parameter, the operator increases a velocity loop gain. If the gain is increased too greatly, vibration occurs, as shown in FIG. 28(b). While viewing the appearance of this vibration on the synchroscope 41, the operator sets a maximum gain at which the vibration does not take place. The response at the gain set as described above is indicated as signal waveform (iii) FIG. 28(a)).

Elements associated with control of a servo or a spindle that need to be tuned by the numerical control unit include a velocity loop control system, a position loop control system, spindle orientation c-axis control, and the like. Control parameters within the velocity loop control system that need to be tuned include, for example, a velocity loop gain, a velocity lead compensation, machine resonance suppression filter central frequency, and other such parameters, including multiple control parameters.

Also known in the prior art is the process of automatic tuning of control values in a process control system. For example, Japanese Patent Publication No. 83703/1990 relates to the automatic tuning of the control parameters of a proportional, integral, differential (PID) control or PI control elements in a process control system. According to this process, the control parameters are continuously monitored, and when a feedback value offsets from a reference value, the automatic tuning function is activated to operate on an offset value according to a fuzzy inference. Such a tuning process does not cure the foregoing problems of a numerical control unit for controlling a machine tool because the numerical control unit requires tuning when proper accuracy is not provided at the time the machine is installed, or due to mechanical system variations with time. The tuning of the control parameters of such a numerical control unit does not require continuous automatic tuning.

Thus, tuning the control parameters for a servo or spindle motor drive system, carried out as described above, requires measuring devices such as a synchroscope and a CRT screen. Where one numerical control unit has a plurality of servo or spindle drive systems to be tuned, each servo or spindle motor drive system has a plurality of control parameters that must be tuned. A skilled operator must therefore tune a wide variety of control parameters which each influence each other, thus creating a complicated relationship therebetween. Moreover, the control parameters are not changed accurately on the basis of definite data; instead they are often changed on a trial and error basis by the operator. Such a tuning process requires much time and often leads to an individual difference between tuning results.

SUMMARY OF THE INVENTION

It is, accordingly, an object of the present invention to overcome the disadvantages in the background art by providing a numerical control unit equipped with an automatic tuning function which does not require measurement devices such as a digital-to-analog converter and a synchroscope and allows any operator unfamiliar to the tuning of the control parameters to tune the control parameters without individual differences.

It is another object of the present invention to enable a simpler standardized automatic tuning device to be developed by compiling stored automatic tuning data which is the tuning history and results at the installation and tuning times of a machine tool on a field site.

It is a further object of the present invention to allow automatic tuning and test run programs to be added and/or changed without replacing the numerical control unit and computer themselves, in response to any change and/or addition of automatically tuned items in the future or after shipment.

It is as further object of the present invention to provide a method which allows the criterion for the feature values set by an automatic tuning program to be changed in accordance with the characteristics of the machine, and the like.

It is yet a further object of the present invention to provide a process which allows the feature value of a control parameter under each of several tuning conditions to be calculated, even when a single control parameter has multiple tuning conditions, and to have those feature values determined comprehensively.

In accordance with the first embodiment of the invention, servo or spindle control parameters of a machine tool, etc. can be automatically tuned with an N/C device and, at the same time, an automatic tuning program for generating new control parameters can be easily added or changed later.

In accordance with the second embodiment of the invention, servo or spindle control parameters of a machine tool, etc. can be automatically tuned by an external computer linked with the N/C device and, at the same time, an automatic tuning program for generating new control parameters can be easily added or changed later.

In accordance with an additional feature of the invention, in addition to the effects obtained by the first or second embodiments, the tuning history and tuning results of the control parameters can be taken back to tool machine makers or N/C device makers.

In accordance with another feature of the invention, in addition to the effects obtained by the first or the second embodiments, users can arbitrarily adjust for control parameters which are not prepared for or automatically tuned by machine tool makers or N/C device manufacturers.

Another feature of the invention allows the criterion value for the "feature values" of the control parameter set in the program by a manufacturer to be automatically changed and the criterion to be changed between machines.

The invention also allows each tuning condition to be weighted and further a comprehensive assessment required for a machine to be made where a single parameter has multiple tuning conditions, whereby the machine can provide a maximum performance.

As a further feature of the invention, initial setting is not required by keyboard etc. when automatic tuning is made, since the status value of control parameters which are automatically tuned are automatically taken in for a predetermined length of time as sampling data.

BRIEF DESCRIPTION OF THE DRAWINGS

FIG. 5 shows an automatic tuning menu screen.

Table 1 is a list illustrating automatic tuning data sampling settings for the velocity loop control system.

Table 2 is a list illustrating automatic tuning data sampling settings for the position loop control system.

Table 3 illustrates a comprehensive tuning condition judgment program for various control parameter condition types.

Table 4 illustrates test run data used in correlating the feature value and the assessment point.

Table 5 illustrates initial settings of tuning conditions.

DESCRIPTION OF THE PREFERRED EMBODIMENTS

Figure 1:
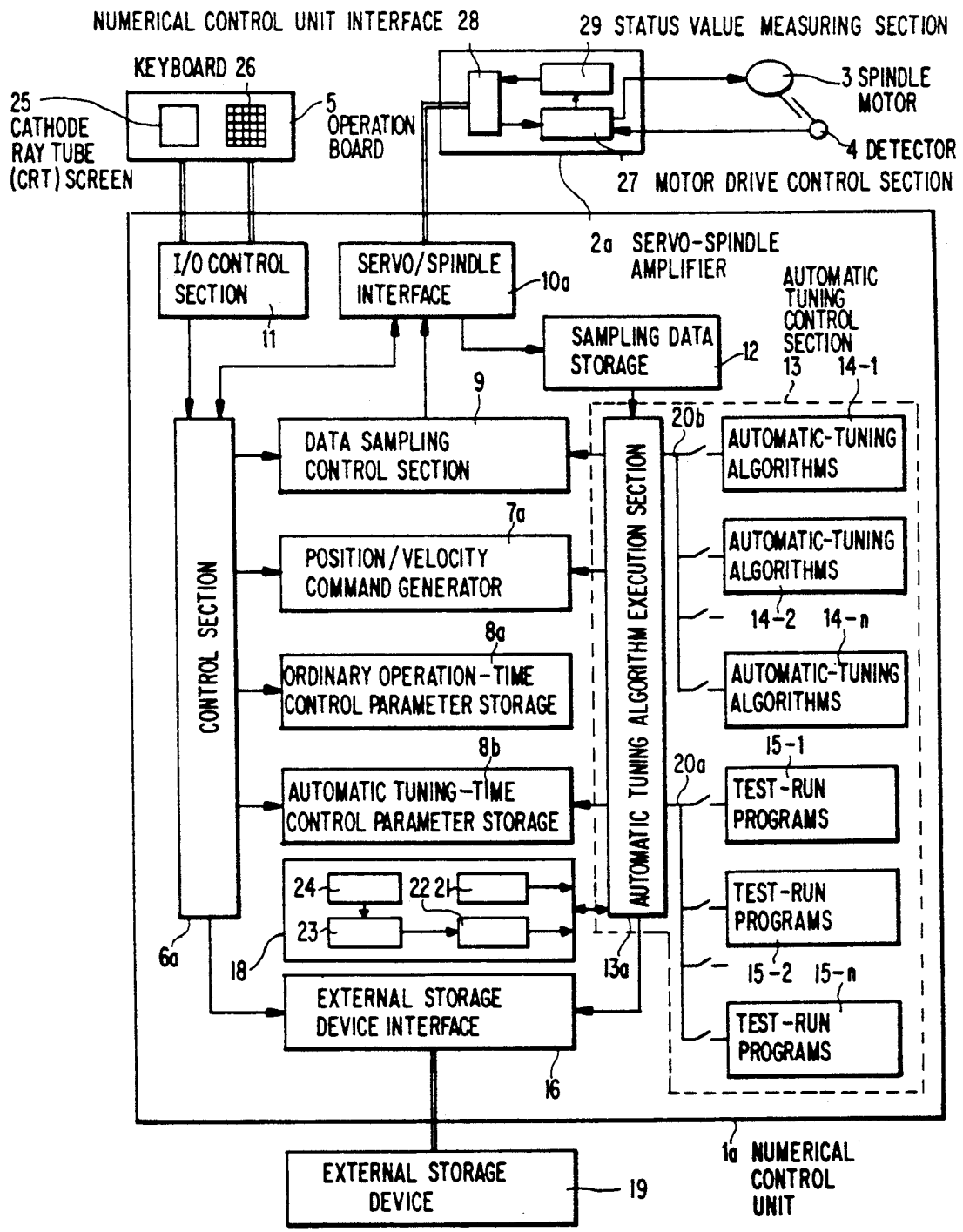
FIG. 1 is a function block diagram of an embodiment of a numerical control unit equipped with an automatic tuning function and a servo or spindle amplifier in accordance with the present invention.

An embodiment of the present invention will now be described with reference to the appended drawings. FIG. 1 is a block diagram illustrating a numerical control unit and a servo or spindle amplifier for automatically tuning the control parameters of a servo or spindle motor drive system in accordance with the present invention. In the preferred embodiment, the numerical control unit 1a is composed of at least a control section 6a, for controlling the general functions of the numerical control unit 1a, a position/velocity command generator 7a, for generating position and velocity commands, an ordinary operation-time control parameter storage device 8a for storing the control parameters transmitted to the servo or spindle amplifier 2a when the numerical control unit 1a operates in an ordinary mode and an automatic tuning-time control parameter storage device 8b for storing the control parameters in the ordinary mode. A data sampling control section 9 specifies status value data transferred from the servo or spindle amplifier 2a as sampling data and sets a sampling interval therefor.

A servo or spindle interface 10a transfers data between the numerical control unit 1a and the servo or spindle amplifier 2a. I/O control section 11 controls the input and outputs of the numerical control unit 1a relative to operation board 5. A sampling data storage device 12 stores the sampling data according to the data sampling control section 9. An automatic tuning system control section 13 is activated when the automatic tuning mode is selected for controlling the general functions concerned with the automatic tuning. Automatic tuning programs 14-1 through 14-n are selected according to the control parameters that are to be tuned. Test run programs 15-1 through 15-n are also resident in the numerical control unit 1a and selected in accordance with the control parameter to be tuned.

An automatic tuning control section 13 is included for controlling the data sampling control section 9, the position/velocity command generator 7a, and the like, by means of automatic tuning programs 14-1 to 14-n selected according to the control parameter to be tuned via select switches 20a to 20b. A criterion storage/change control section 18 is provided for controlling the storage and change of a criterion. A criterion storage 21 is provided for storing the criteria of feature values employed to determine whether the control parameters are appropriate or not, a new criterion storage 22 is provided for storing new criteria changed according to machine characteristics, a criterion changing section 23 is provided for generating new criterion values, and a change data storage 24 is provided for storing data used to change the criteria.

The servo or spindle amplifier 2a has a status value measuring section 29 in addition to the motor drive control section 27. The numerical control unit interface 28 of the prior art servo spindle amplifier 2c is also contained in the spindle amplifier 2a of the present invention.

Figure 2A:
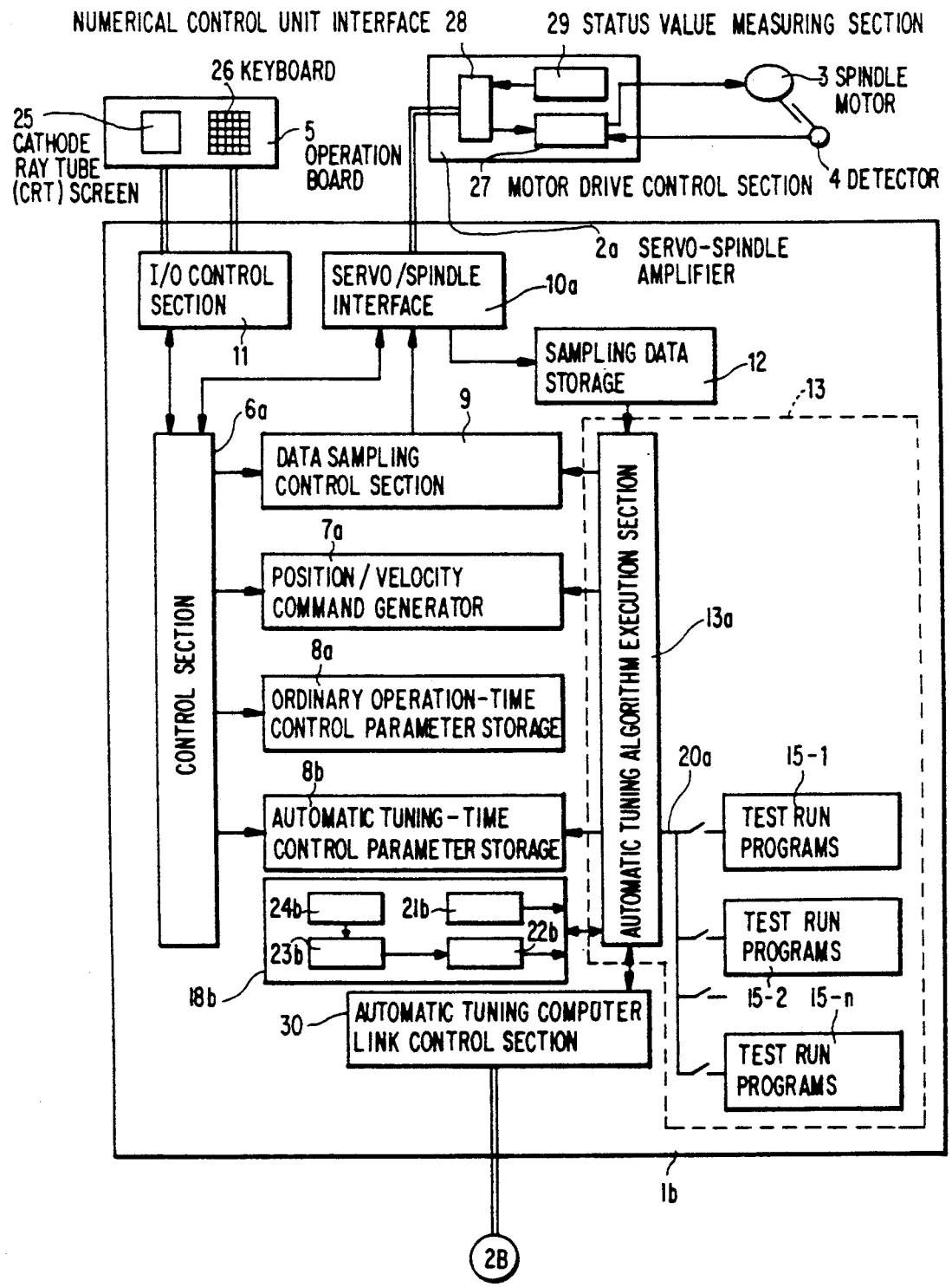
FIGS. 2A and 2B are function block diagram of an embodiment of a numerical control unit equipped with an automatic tuning function, a servo or spindle amplifier, and an external computer in accordance with the present invention.
Figure 2B:
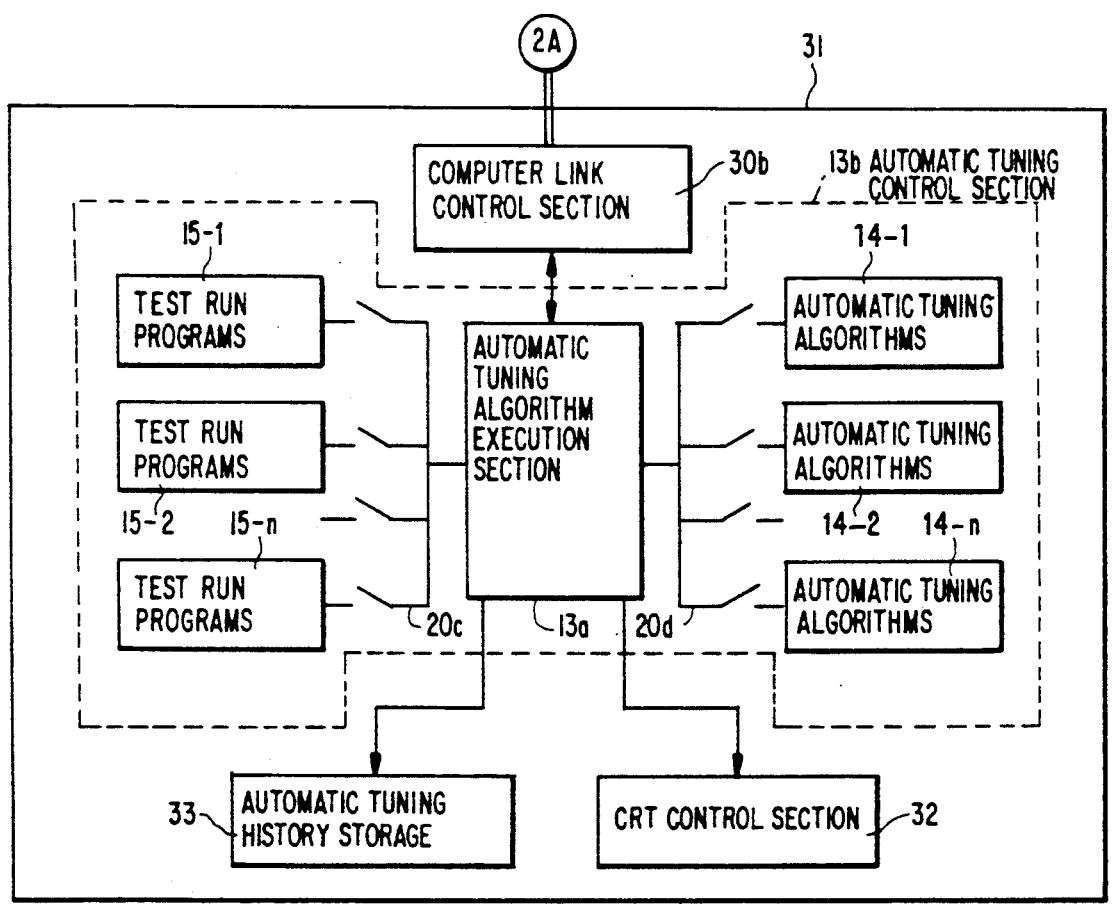

Another embodiment shown in FIG. 2 implements the automatic tuning function of the present invention by employing an external computer other than a numerical control unit. The external computer may be a personal computer or other external controlling device. In the figure, the servo or spindle amplifier 2b, the servo or spindle motor 3, the detector 4, and the operation board 5 are identical to the corresponding components, described above. The numerical control unit 1b, however, does not have the automatic tuning programs 14a-14n, as in the numerical control unit 1a depicted in FIG. 1. The numerical control unit 1b, instead, has an additional automatic tuning computer link control section 30 that is connected to external computer 31.

The external computer 31 is composed of at least an automatic tuning control section 13b activated when the automatic tuning mode is selected. Automatic tuning programs 14-1 through 14-n are selected according to the control parameter to be tuned. The external computer 31 further includes test run programs 15-1 through 15-n, a computer link control section 30b for establishing a link with the numerical control unit 1b, a criterion storage/change control section 18b, having identical functions to the criterion storage/change control section 18 in FIG. 1, and a screen display control section 32 for controlling a CRT and a keyboard. An automatic tuning history storage system 33 is also present in the external computer 31 for storing the automatic tuning history, control parameters, control parameter criteria, and the like.

Figure 3:
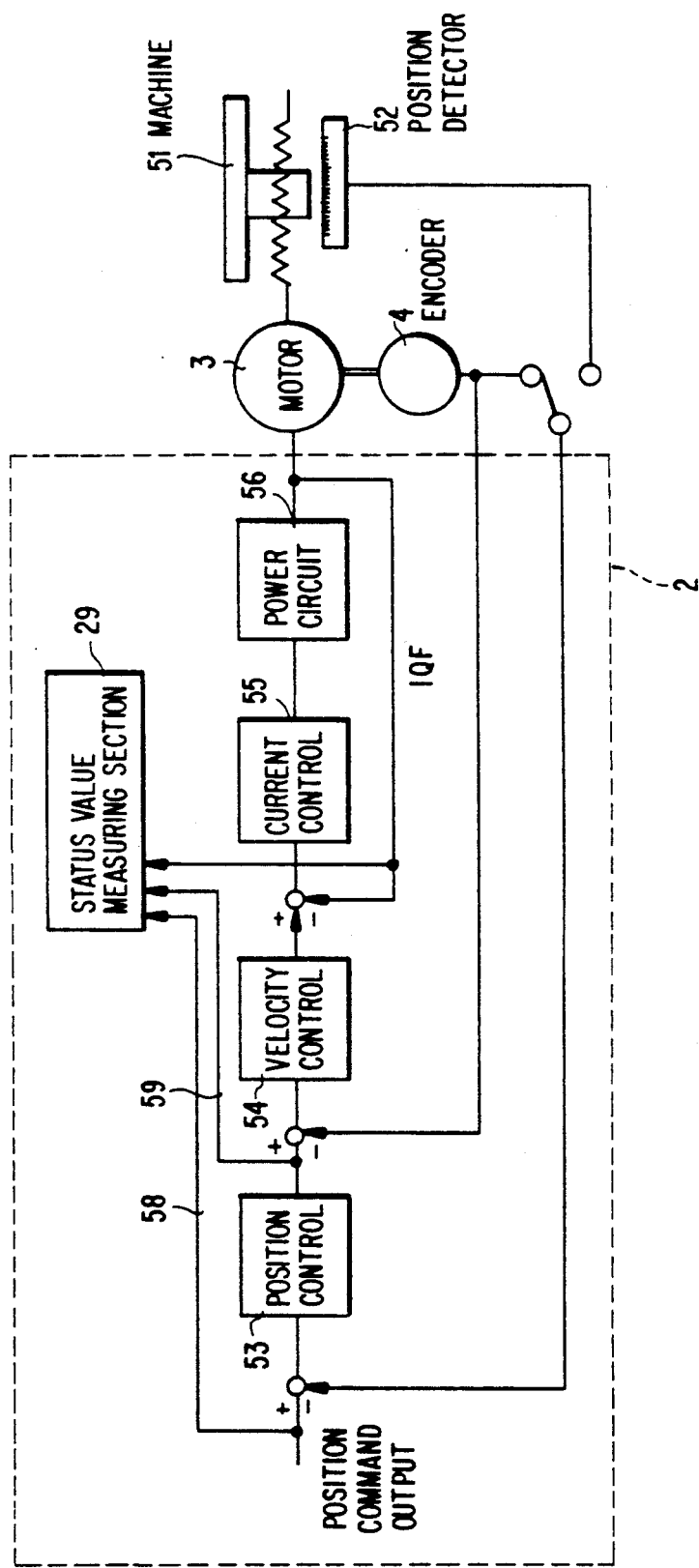
FIG. 3 is a function block diagram of an embodiment of a servo or spindle amplifier associated with the numerical control unit equipped with the automatic tuning function in accordance with the present invention.

During the automatic tuning described above, a function of fetching status value data is required. This data is used as sampling data and is taken from the servo amplifier 2a (shown in more detail in FIG. 3). In operation, a status value measuring section 29 measures, at a given cycle, a torque current feedback IQF (line 57), a position command PCMD output (line 58) from the numerical control unit 1a or 1b, a velocity command VCMD (line 59), and other status value data in the servo spindle amplifier 2a (as indicated in Table 1).

TABLE 1

| Sampling data | Position command (PCMD) Velocity command (VCMD) Torque current feedback (IQF) |
|---|---|
| Sampling interval | Communication cycle × 1 |
| Trigger condition | (PCMD > PCMD0) and (VCMD > VCMD0) Upward trigger |
| Number of valid data | Before trigger TGB = 0 |

TABLE 1-continued

After trigger TGF = 512

Status value measuring section 29 then transfers such data to the numerical control unit 1a or 1b. The data thus transferred represents the status of the machine 51 driven by motor 3. As shown in the figure, a machine end position or angular value is detected by a position detector 52. Either the detection value of the position detector 52, or that of an encoder 4 at the motor end, is employed for position control. A position control section 53 controls the position of the machine 51 or the motor 3, while a velocity control section 54 controls velocity of the motor, a current control section 55 controls current flow through the motor 3, and a power circuit 56 generates the current in accordance with the command of the current control section 55.

The status value data sampled above is stored in sampling data storage device 12 via the data sampling control section 9 in the numerical control unit 1a or 1b. The function which causes this data storage is set forth in FIG. 6. In particular, the data sampling control section 9 sets the sampling data according to the automatic tuning program activated at step S13 (FIG. 4) in step S31. By way of example, the position command PCMD and the current feedback IQF are set as such sampling data. Then, in accordance with the directive of the automatic tuning program, the data sampling control section 9 sets a sampling cycle to a product of a communication cycle of the numerical control unit 1a or 1b and that of the servo or spindle amplifier 2a (S32). The trigger conditions used as a basis of timing for storing the sampling data into the sampling data storage device 12 are set in accordance with the directive of the automatic tuning program (S33). These trigger conditions include data to be triggered, a trigger level, and a trigger direction. Any arbitrary operation result of one or more samples of such data set at step S31 can be set as the data to be triggered. In addition to the PCMD set in FIG. 6, arithmetic operation and logic operation results of a plurality of samples of data among the sampling data can be set, for example, as indicated in the following expressions:

(Data to be triggered) = PCMD × IQF (Data to be triggered) = PCMD ∩ IQF

Figure 6:
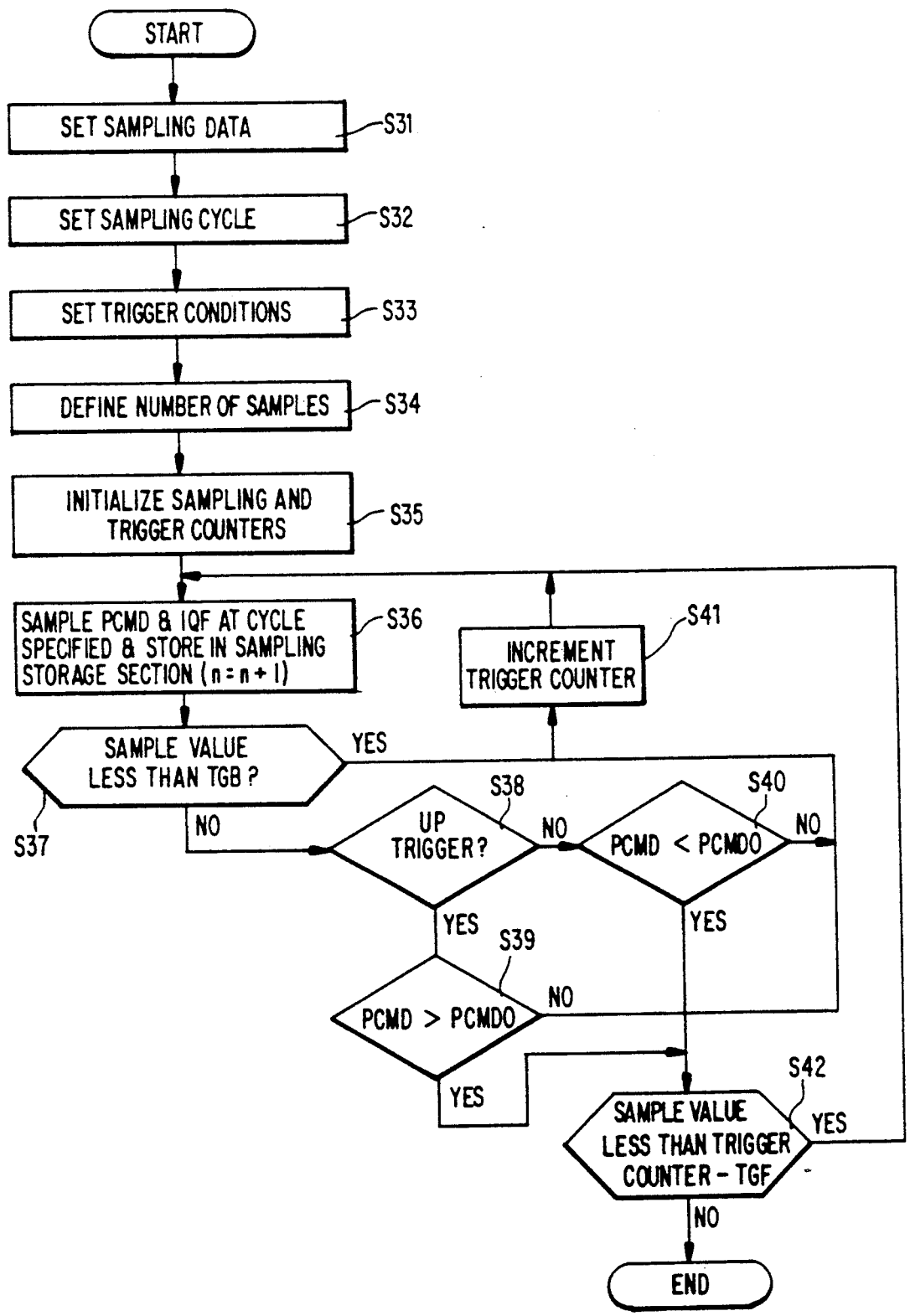
FIG. 6 is a flow chart illustrating an embodiment of a function for causing the numerical control unit equipped with the automatic tuning function in accordance with the present invention to automatically fetch data.

The trigger level is a set value that is to be compared with the previously set data to be triggered. The trigger direction is used to choose the base timing for storing the sampling data into the sampling data storage device 12 from among the data that has risen above the trigger level, fallen below the same, and gone in both directions. For example, as shown in FIG. 6, the trigger level has been set to PCMD0, and the trigger direction is indicated in the upward direction or the upward trigger. The data made valid among the sampling data stored in the sampling data storage device 12, according to the automatic tuning program, is set by defining the number of samples of the sampling data that precedes the trigger-measured base timing and that of the sampling data following the same (S34).

The data ranging from the sampling data stored in the sampling data storage device 12 preceding the trigger-measured base timing TGB to that following the base timing TGF has been set as valid. A sampling counter, whose count will be represented as N in FIG. 6 and a trigger count whose count is represented by N0 in FIG. 6, are both initialized to initiate the sampling process (S35). The data set in S31 out of the status value actually transferred from the servo amplifier 2a, is sampled at the cycle specified in step S32 and stored in the storage device 12 (S36). The sampling counter is then incremented by 1. When the sampling counter value is less than the TGB or until the trigger conditions set at S33 are satisfied, the trigger counter is incremented by 1 and the processing returns to step S36 (S37 through S41). Thereafter, steps S36 through S41 are repeated until the sampling counter value exceeds the TGB and the trigger conditions set at S33 are satisfied. After these trigger conditions are satisfied (S39 or S40), the trigger counter is expired and only the sampling counter counts from that step onward. When the sampling counter value is smaller than the trigger counter value plus the number of samples of after-trigger valid data TGF, the operation returns to step S36. At this time the sampling data is stored, and the sampling counter keeps counting. The sampling is terminated when the sampling counter value reaches or exceeds the sum of the counter value and the TGF at step S42.

Figure 4:
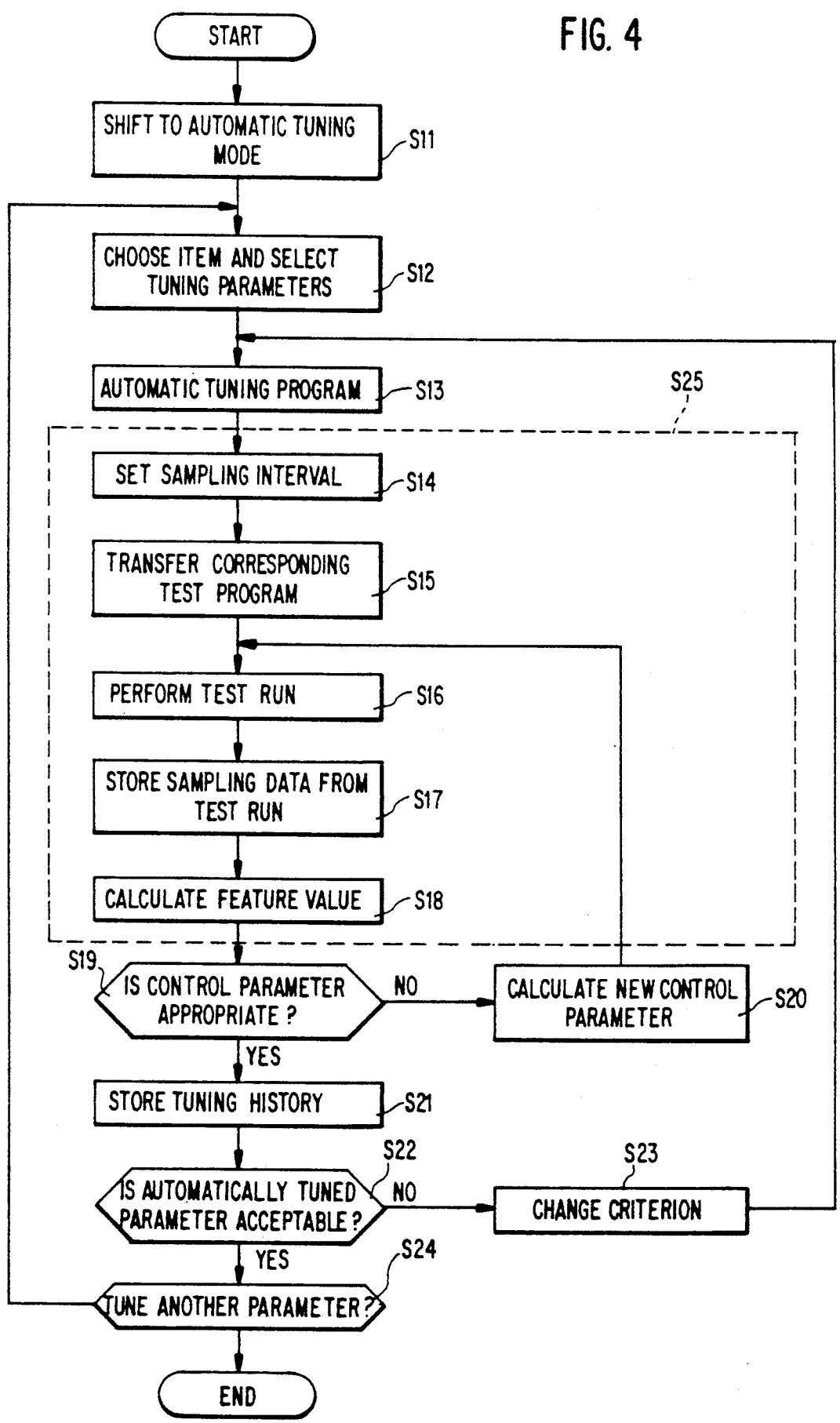
FIG. 4 is a flow chart of an embodiment for tuning control parameters by means of a numerical control unit equipped with an automatic tuning function in accordance with the present invention.

FIG. 4 illustrates a flow chart showing the procedure of tuning the control parameters employing the external computer 31 linked with the numerical control unit 1a or 1b equipped with the automatic tuning function. Initially, the operator controls the keyboard in accordance with the instructions displayed on the CRT of the operation board 5 or the external computer 31 to shift the numerical control unit 1a or 1b from an ordinary operation mode to the automatic tuning mode (S11). When the numerical control unit 1a or 1b has entered the automatic tuning mode, an automatic tuning menu screen, for example, as shown in FIG. 5, appears on the CRT. The operator chooses a required tuning item on the screen to select the corresponding control parameter or parameters (S 12). According to the control parameter shown at step S12, the corresponding automatic tuning program 14-1 (FIGS. 1, 2) is selected and activated (step 13).

In accordance with the directive of the automatic tuning program selected and activated, the data sampling control section 9 specifies, as sampling data, one or more pieces of status value data from among the status value data transferred from the servo or spindle amplifier 2a, and then sets a sampling interval (step 14). Also in accordance with the directive of the automatic tuning program, the test run program corresponding to the control parameter, from among the test run programs 15-1 through 15-n (FIGS. 1, 2), is transferred to the position/velocity command generator 7a (S15).

The position/velocity command generator 7a generates a position/velocity command and transfers the command to the servo or spindle amplifier 2a via the interface 10a. In accordance with this command, the amplifier 2a drives the motor 3 to perform a test run (S16). During this test run, the data sampling control section 9 stores the sampling data in the sampling data storage device 12 (S17). From the data stored in device 12, the automatic tuning control section 13 calculates a feature value in accordance with the directive of the automatic tuning program (S18). This feature value indicates a torque current area or vibration assessment value in a velocity loop control system of the servo.

Figure 7:
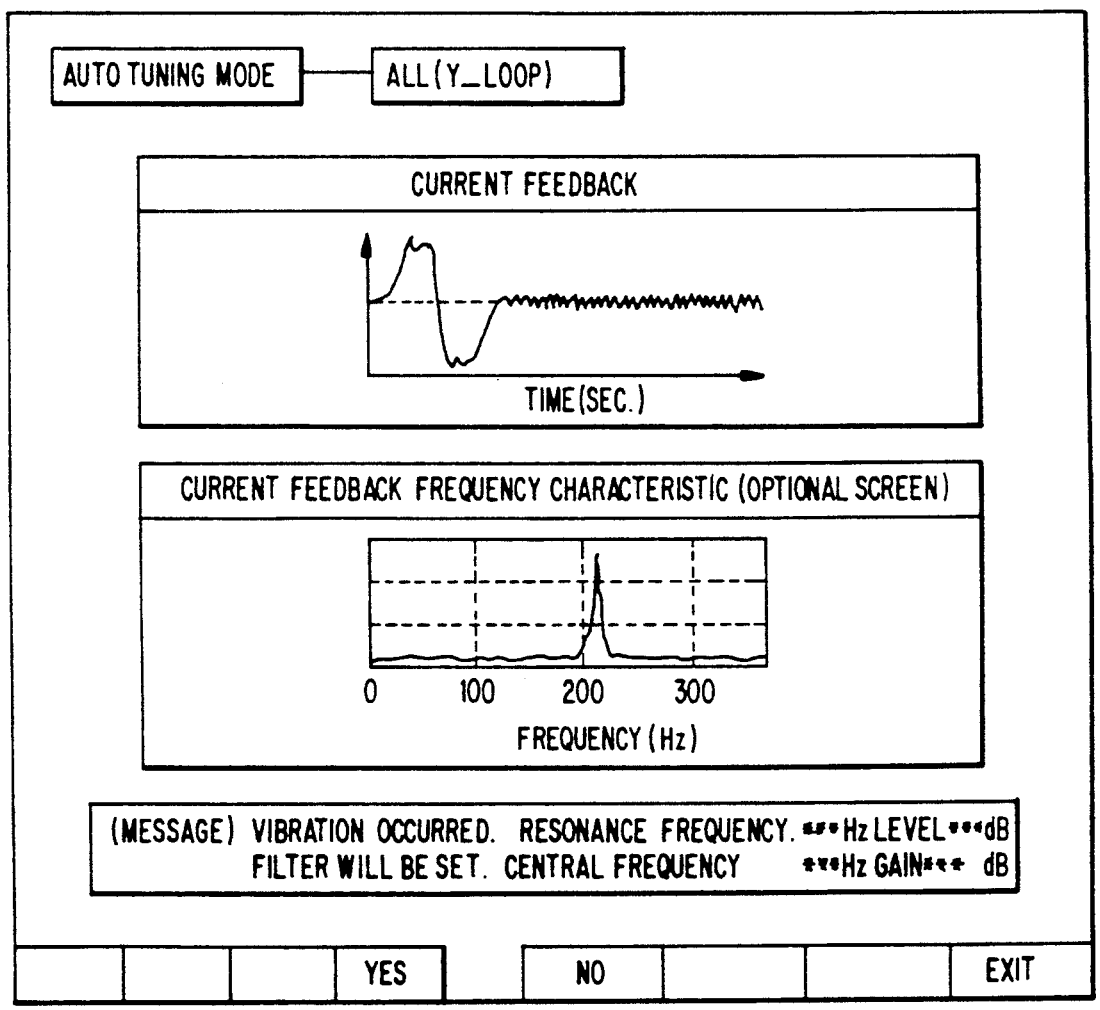
FIG. 7 illustrates a CRT screen during velocity loop tuning.

According to the feature value thus calculated, it is determined whether the control parameter is appropriate or not (S19). If it is inappropriate, a new control parameter value is calculated according to the automatic tuning program, and the result is stored in the control parameter storage device 8b (S20). The control section 6a transfers the new control parameter to the servo or spindle amplifier 2a (S20). The steps S16 through S20 are then repeated thereafter until the control parameter is determined to be appropriate. When a control parameter has been determined to be appropriate, a tuning history is stored in external storage device 19 or storage device 33 of the external computer and the tuning of one control parameter is terminated. An example of data during the velocity loop tuning in the test run is shown in FIG. 7 (S21).

At step S22, the operator is forced to determine whether the control parameter automatically tuned is acceptable or not. If the operator has determined that accuracy, etc. should be increased in view of the machine characteristics, performance, etc., and the like, and that the control parameter resulting from the automatic tuning process needs to be changed, the operator selects the criterion storage/change control section 18 or 18b at step S23 to automatically change the criterion, or the user directly enters a new criterion from the keyboard and performs automatic tuning again.

At this time, the operator may wish to tune another control parameter (S24). When another control parameter is to be tuned, the processing returns to step S12. When the operator does not select another control parameter for tuning, the numerical control unit 1a or 1b leaves the automatic tuning mode and shifts to the ordinary operation mode. Note that the steps S14 to S18 can also be called from other programs as a subprogram S25.

The automatic tuning programs discussed above will now be described in detail. It should be noted that the automatic tuning program activation/initialization step S13, the data sampling function setting step S14, the test run program selection step S15, the feature value calculation step S18, the control parameter appropriateness determination step S19, and the new value calculation process step S20, shown in FIG. 4, are different for each control parameter to be tuned and are stipulated by the automatic tuning program 14-1 in FIGS. 1 and 2.

Figure 8:
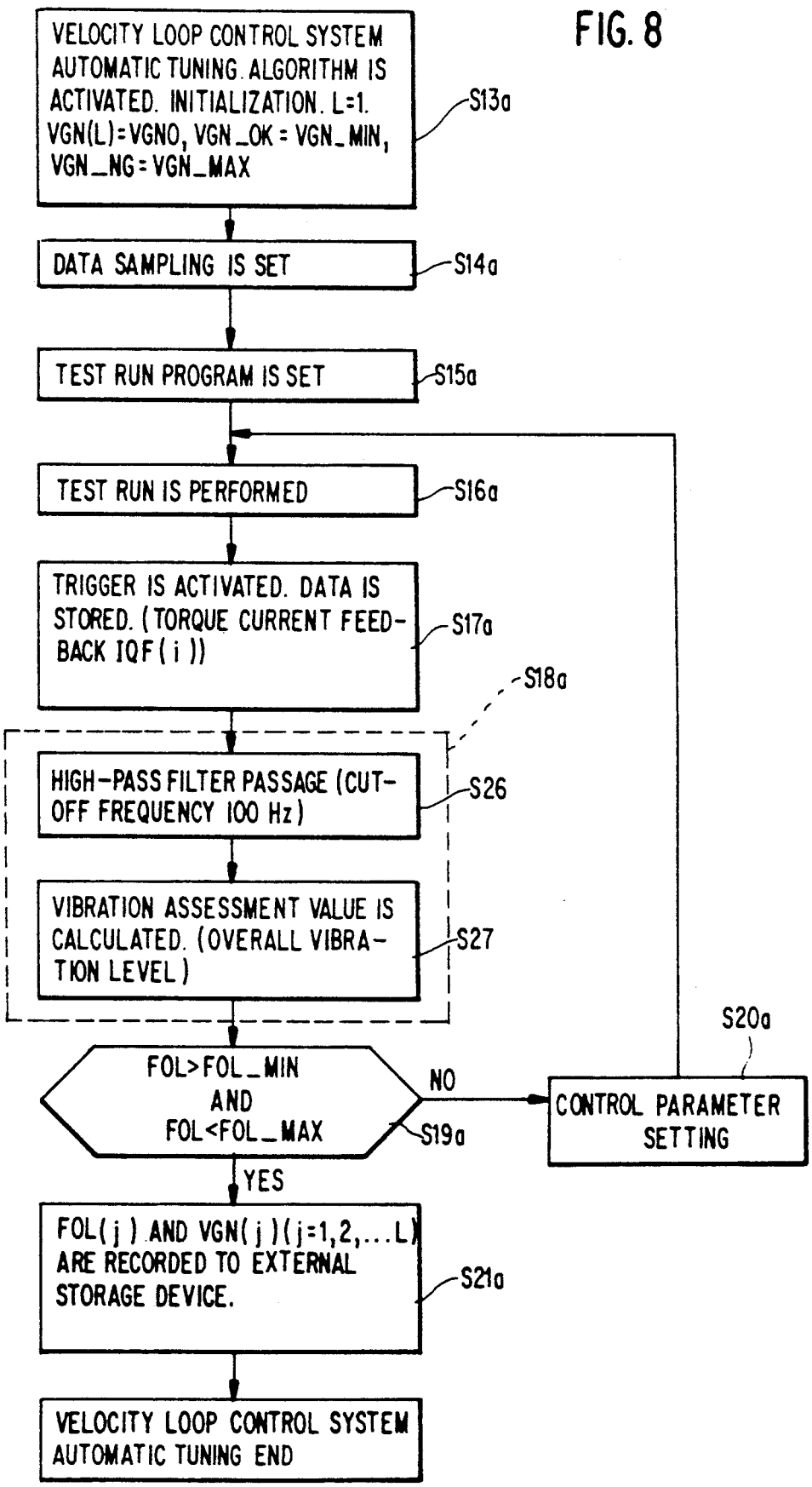
FIG. 8 is a flow chart of an embodiment of an automatic tuning program for a velocity loop control system.
Figure 9:
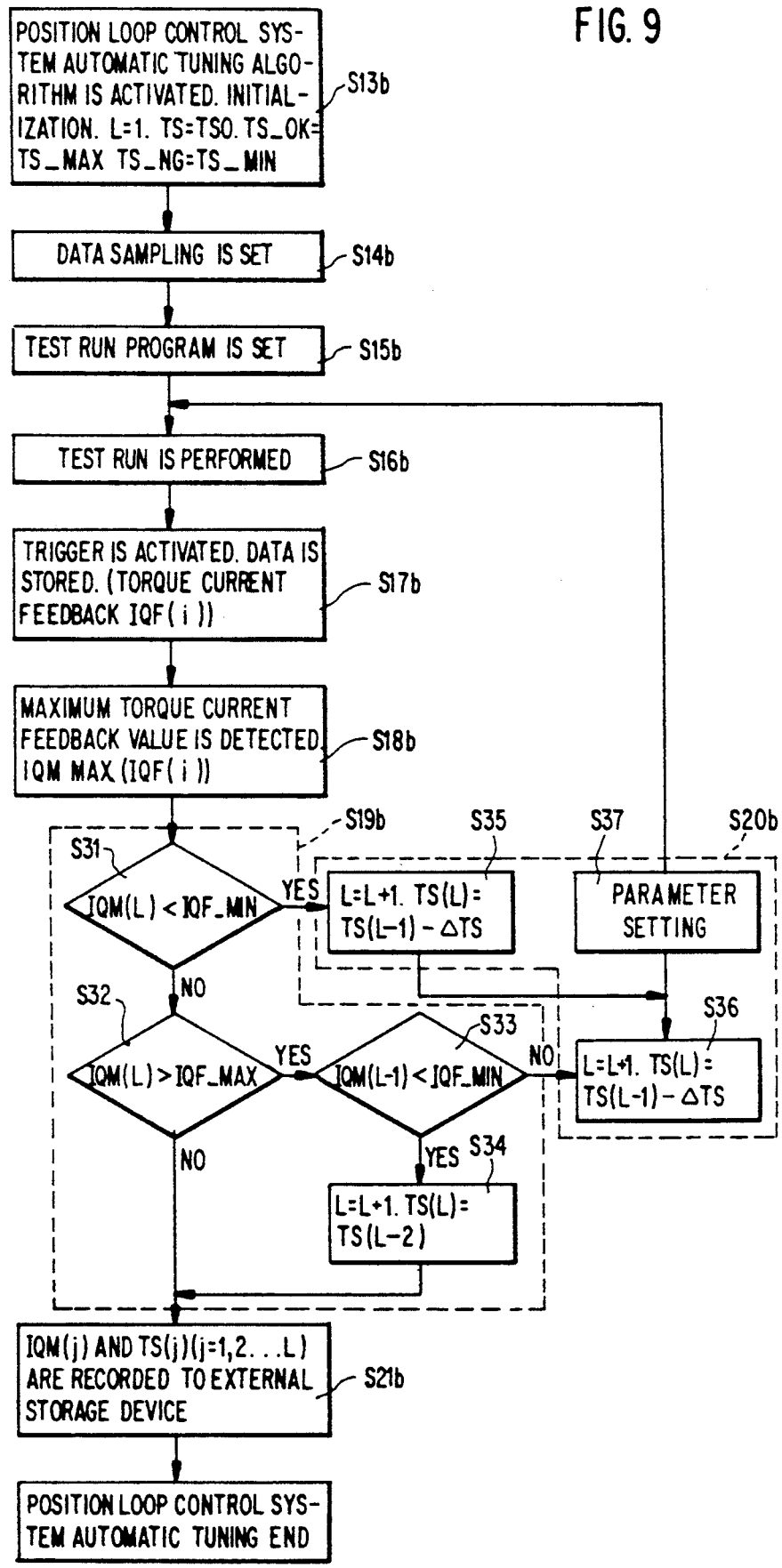
FIG. 9 is a flow chart of an embodiment of an automatic tuning program for a position loop control system.

FIG. 8 is a flow chart illustrating processing performed where the automatic tuning of a velocity loop control system has been selected and the velocity loop control automatic-tuning program has been activated at step 12. FIG. 9 is a flow chart showing processing performed where the automatic tuning of a position loop control system has been selected and a position loop control automatic-tuning program has been activated at step S32.

In the velocity loop control system, initialization is performed at step 13a (FIG. 4), where L (FIG. 8) indicates an integral value denoting the number of trial or sample sequences of the test run, the feature value calculation, the appropriateness determination, etc., and where VGN0, VGN_MIN and VGN_MAX represent an initial value, a minimum set value, and a maximum set value, respectively, of a velocity loop gain.

In the position loop control system, initialization indicated at step 13b is also performed, where L represents the same parameter as in the velocity loop control system; however, TS0, TS_MIN and TS_MAX represent an initial value, a minimum set value, and a maximum set value, respectively, of an acceleration/deceleration time constant.

TABLE 2

| Sampling data | Position command (PCMD) |
| --- | --- |
| | Torque current feedback (IQF) |
| Sampling interval | Communication cycle × 2 |
| Trigger condition | (PCMD ≠ PCMD0) |
| | Upward trigger |
| Number of valid data | Before trigger TGB = 10 |
| | After trigger TGF = 1,000 |

The data sampling control section 9 is operated according to specifications previously indicated in Table 1 and above in Table 2 for the velocity loop control system (S14a), and the position loop control system (S14b), respectively. That is, the data sampling control section 9 is set, in the velocity loop control system, to store data, beginning at a point when a position command to the motor has become constant after acceleration/deceleration is finished, and in the position loop control system, to store data from when acceleration/deceleration is started to when it is finished. Assuming that the data has been sampled with the above settings, examples of the sampling data can be seen in FIGS. 10 and 11.

Figure 10:
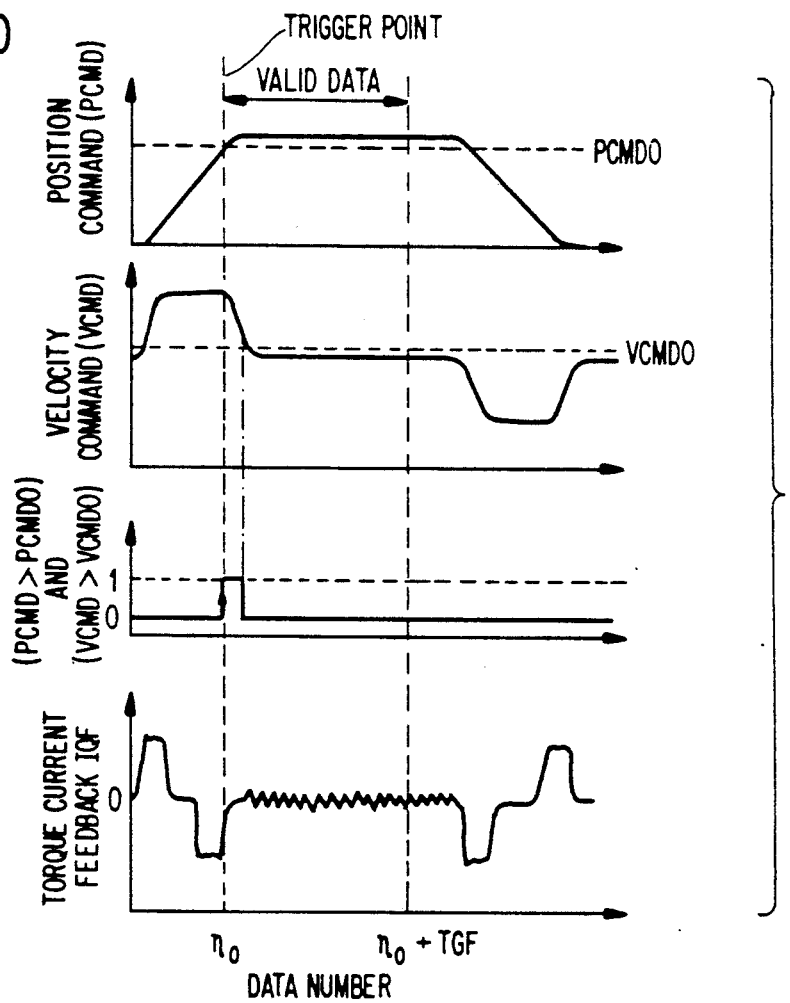
FIG. 10 shows data sampling results produced by the automatic tuning program for the velocity loop control system.

Specifically, FIG. 10 shows the example given for the velocity loop control system. A trigger point is established at the instance where both a position command PCMD and a velocity command VCMD in the sampling data have risen above their respective reference values. After this trigger point, the number of samples of valid data TGF are stored in the sampling data storage device 12.

Figure 11:
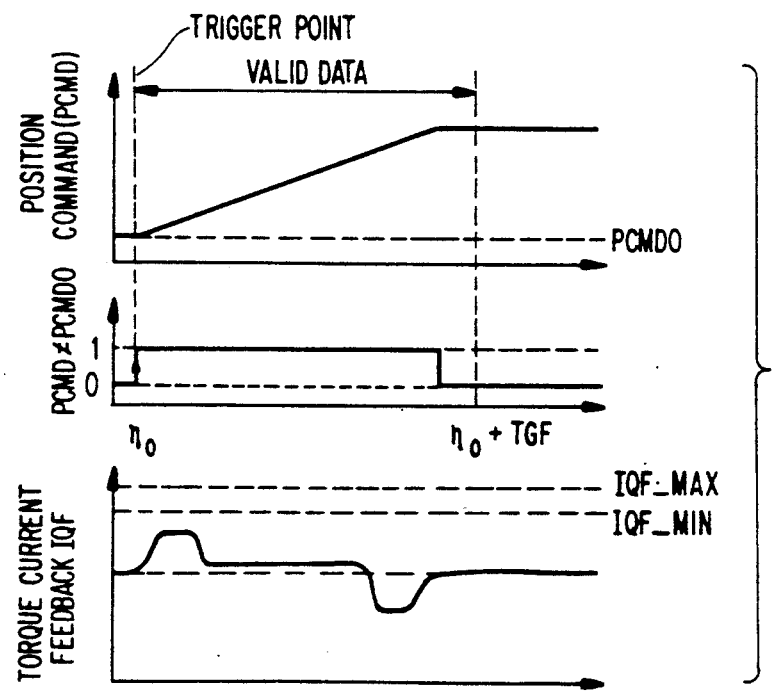
FIG. 11 illustrates data sampling results using the automatic tuning program for the position loop control system.

FIG. 11 shows the example provided for the position loop control system wherein the trigger point occurs at the instant when the position command PCMD changes from a trigger level PCMD0. At this point, data ranging from the sample data preceding the trigger point (TGB, the number of samples of data valid before the trigger) to the data following the trigger point (TGF, the number of samples of data valid after the trigger) is stored in the sampling data storage device 12. It should be noted that the data sampling control section 9 is set so that data sampled from the time acceleration or deceleration has ended and the motor has come to rest, is stored in the velocity loop control system, and data sampled from the time acceleration or deceleration started to the time that it ended is stored in the position loop control system. The position velocity command generator 7a selects and loads the test run program in accordance with the directive of the automatic tuning program (S15a and S15b).

Figures 12, 13, 14:
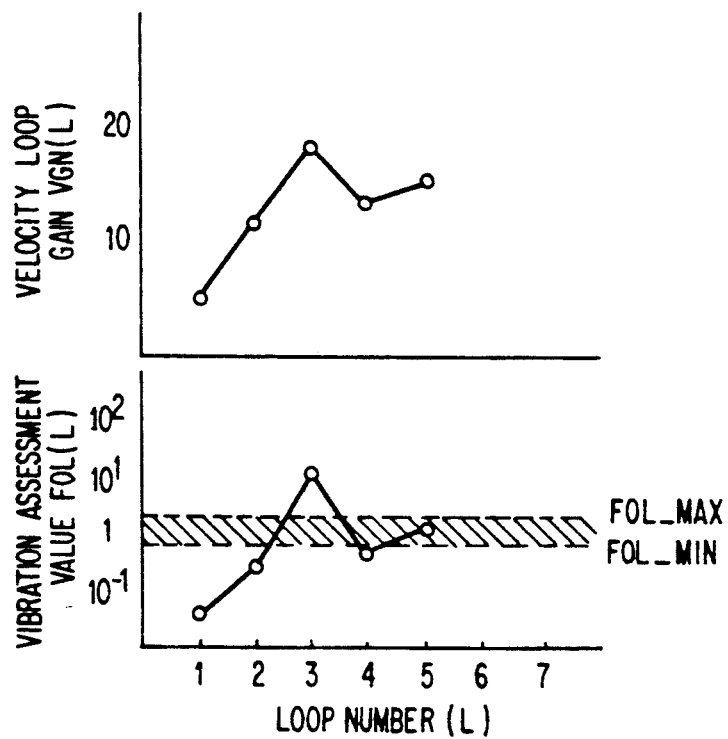
FIG. 12 provides an example of a test run program in the automatic tuning of the velocity loop control system.
FIG. 13 gives an example of a test run program in the automatic tuning of the position loop control system.
FIG. 14 is a transition diagram of a velocity loop gain and a vibration assessment value during the automatic tuning of the velocity loop control system.

An example of the test run program or the velocity loop control system is shown in FIG. 12. In the example, feed value has been set to 10 mm because data during the acceleration or deceleration time is not used as sampling data in the velocity loop control system, and the period of time when a certain position command is given to the motor is set to 2 seconds (2000 ms) during which time the sampling data is fetched. An example of the test run program for the position loop control system is shown in FIG. 13, wherein a feed value has been set to 50 mm because data is sampled during acceleration or deceleration. At steps S16a and 16b, the position/velocity command generator 7a generates a position command from the run program loaded at steps S15a and S15b, and then performs a test run. In accordance with the data sampling settings established in steps 14a and 14b, the data sampling control section 9 is operated. In the velocity loop control system, vibration components are extracted (S26, FIG. 8), at indicated as step S18a, by a high-pass filter from a torque-current feedback IQF among the data stored in the sampling data storage device 12 by the sampling control section 9. At step S27, a vibration assessment value or an overall vibration level FOL is calculated. This value is a feature value for the velocity loop control system.

In the position loop control system, on the other hand, a maximum value IQM of the torque current feedback IQF among the data stored in the sampling data storage device 12 is detected, as indicated at step S18b (FIG. 9). This value is used as a feature value of the automatic tuning for the position loop control system.

The feature values respectively calculated in the systems above are used as a basis for determining whether the control parameter is appropriate (S19a and S19b). More specifically, in the velocity loop control system, a range determined by a maximum permissible value FOL_MAX and a minimum permissible value FOL_MIN are used to determine whether or not the vibration assessment value FOL falls within this range (S19a). FOL_MAX is selected as the limit above which vibration occurs. If the tuning is judged as inappropriate, a velocity loop gain value for the next trial or sample is calculated at step S21a on the basis of the relationships between the vibration assessment value FOL and its maximum and minimum permissible values. Values VGN_OK (a maximum value of the VGN at the condition of FOL <FOL_MIN), which indicates a history of whether or not vibration took place at the previous trials, VGN_NG (a minimum value of VGN at the condition of FOL>FOL_MAX), and the resultant values of the calculation are stored in the automatic tuning-time control parameter storage device 8b. This control parameter is transferred to the servo or spindle amplifier 2a from the control section 6A, and step S16a and subsequent steps of the test run are then repeated.

Figure 15:
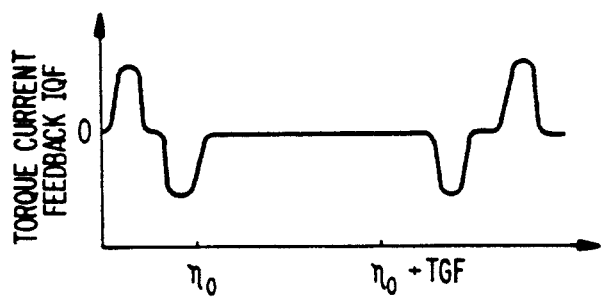
FIG. 15 shows automatic tuning results for the velocity loop control system.

When the tuning has been judged as appropriate at step S19a, the vibration assessment value FOL and the values of the velocity loop gain VGN at the previous trials are recorded in the external storage device 19 or 33 (S21a). The automatic tuning of the velocity loop control system is then terminated. The automatic tuning restored in the external storage device 19 or 33 (S21a) is shown in FIG. 14; that is, the values of the velocity loop gain VGN and the vibration assessment value FOL are shown for each trial. As it can be seen, the velocity loop gain VGN changes according to the parameter calculating program at step S20a. The automatic tuning is completed when the vibration assessment value FOL ultimately enters into the permissible range. As shown in FIG. 15, a torque current feedback waveform which includes vibration components when storing the automatic tuning in FIG. 10, does not include such components on completion of the automatic tuning.

In the position loop control system, the determination whether the feature value or the maximum torque current feedback value IQM is within a range determined by a maximum permissible value IQF_MAX and minimum permissible value IQF_MIN of the torque current, or that the maximum torque current feedback value IQM is larger than the maximum permissible value IQF_MAX and the maximum torque current feedback value IQM at the preceding trial is smaller than the minimum permissible value IQF_MIN is judged at steps S31 through S33, in step S19b.

If the tuning is judged as inappropriate, the value of the acceleration/deceleration time constant TS is incremented or decremented by a determined value according to relationships between the maximum torque current feedback value IQM and its maximum permissible value and its minimum permissible value (S20b). The resultant value is then written to the automatic tuning-time control parameter storage device 8b, as in the velocity loop control system, and the control section 6a transfers this control parameter to the servo or spindle amplifier 2a and repeats the test run beginning at step S16b.

When the tuning has been judged as appropriate (S20b), the values of the feature value or the maximum torque current feedback IQM and the acceleration/deceleration time constant TS at the previous trials are recorded in the external storage device 19 or 33 (S21b). At this point, the automatic tuning of the position control system is terminated.

Figure 16:
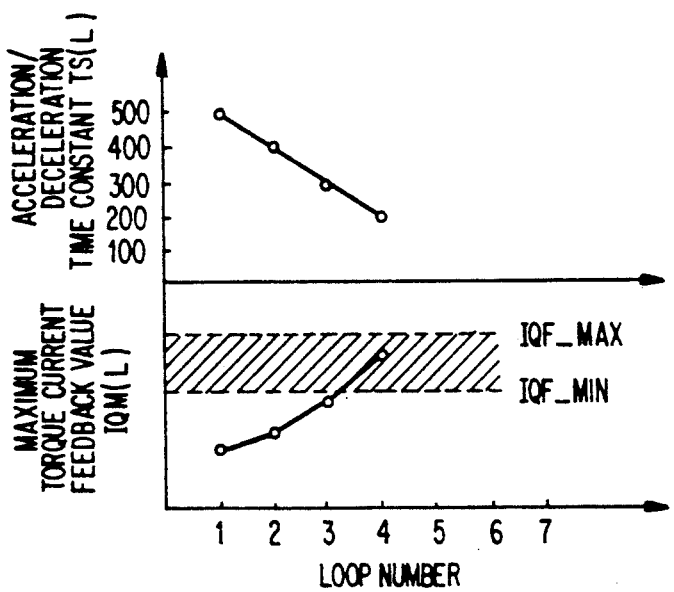
FIG. 16 is a transition diagram of an acceleration/deceleration time constant and a maximum torque current feedback value during the automatic tuning of the position loop control system.
Figure 17:
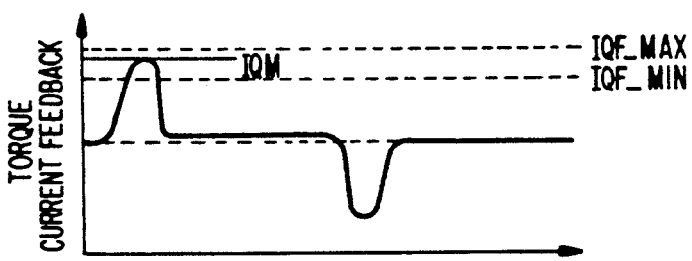
FIG. 17 shows automatic tuning results for the position loop control system.

The values of the acceleration/deceleration time constant TS and the maximum torque current feedback value IQM for each trial are shown in FIG. 16, wherein the acceleration/deceleration time constant TS changes according to the parameter calculating program of step S20a. The maximum torque current feedback value IQM ultimately enters into the permissible range and thus completes the automatic tuning of the parameter. As shown in FIG. 17, the waveform of the torque current feedback is automatically tuned (as shown in FIG. 9) and enters the permissible range on completion of automatic tuning.

A process for changing a criterion value for feature values employed to determine whether a control parameter automatically tuned is appropriate or not in accordance with the actual machine will now be described using a lost motion compensating control parameter as an example.

Figure 18:
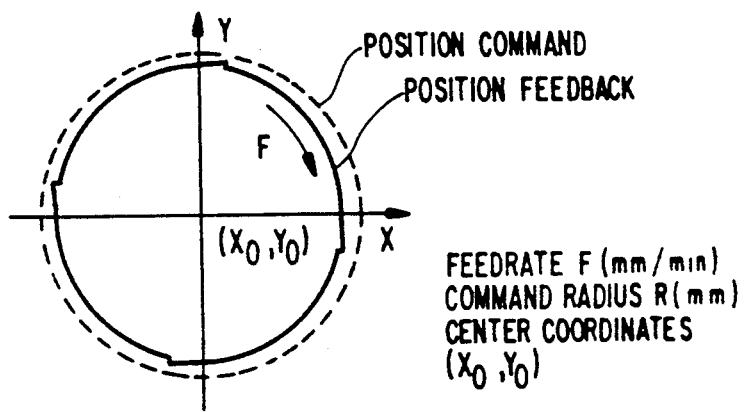
FIG. 18 illustrates an orbit or locus of a machine actually driven by the motor in continuous line when the servo amplifier is provided with a position command.

FIG. 18 illustrates an orbit of a machine actually driven by the motor (the continuous line) when the servo amplifier is provided with a position command to drive the machine in a circular orbit as indicated by a dotted line. When the orbit crosses the X or Y axis (hereinafter referred to as "at the quadrant switching time"), a discontinuity in the orbit occurs as shown in FIG. 18. The lost motion compensation is designed to compensate for such discontinuous orbiting at the quadrant switching time. The lost motion compensating control parameter is a lost motion compensation gain LMC of a torque current, and a radius error ΔR of an actual orbit radius calculated from a command radius R and an actual orbit is the feature value of the lost motion compensation gain.

Figure 19:
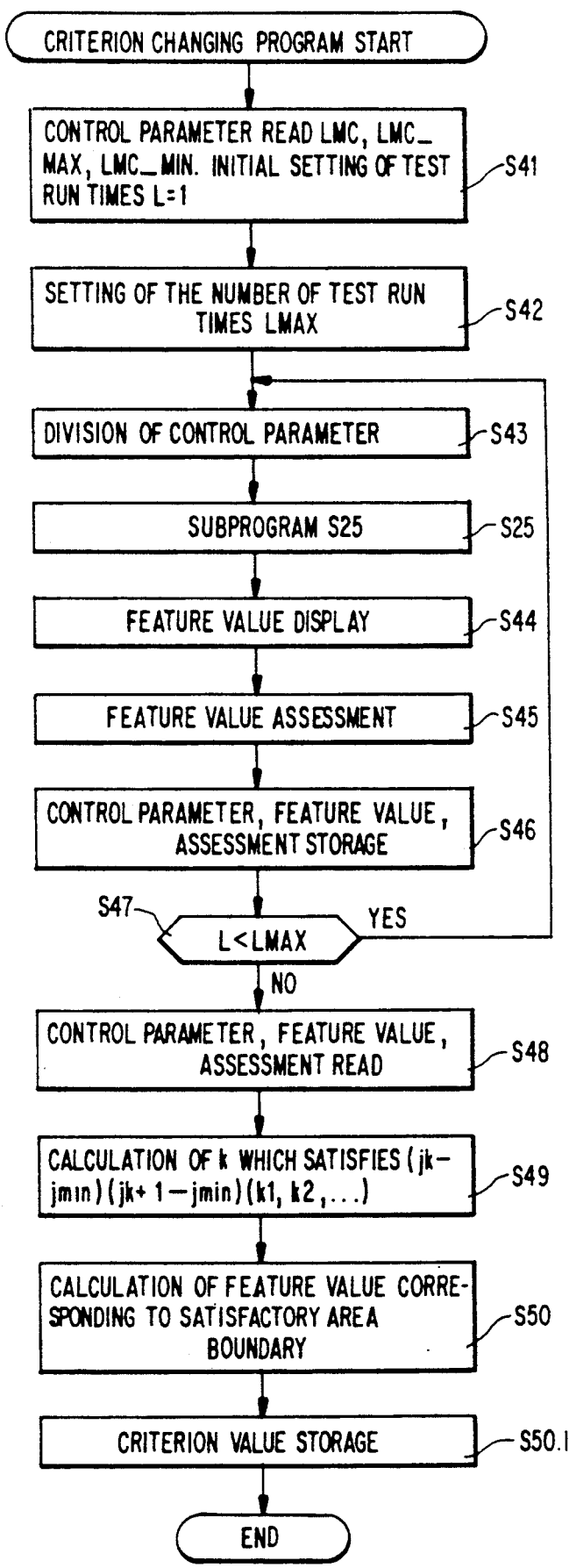
FIG. 19 is a flow chart that illustrates the criterion changing process.

A criterion changing process will now be described using a flow chart shown in FIG. 19.

If the maximum and minimum values of the lost motion compensation gain have been set to LMC_MAX and LMC_MIN, respectively, in the automatic tuning program, an automatic criterion changing program starts by reading the LMC, LMC_MAX and LMC_MIN stored in the control parameter storage device 8b, and sets the number of test run times L to 1 (step S41).

The number of test run times Lmax is then set (step S42), LMCs equally divided between the LMC_MAX and LMC_MIN are operated on (step S43), test run, data sampling and feature value calculation are performed employing said LMC in the subprogram S25 in FIG. 4 (step S25), and the control parameters and feature values are displayed on the CRT 25 (step S44).

Viewing the CRT 25, the operator assigns any of 10-stage assessment points, for example, to each feature value of the test run result using each LMC. The higher the assessment point, the higher the satisfactory degree of accuracy. In the example shown in FIG. 20, on the assumption that the feature value resulting from the test run employing the control parameter LMC (L=i) is fi, f1 is assessed at the worst point 1 since ΔR is negative, f2 at point 9 since ΔR is as good as 1.5 μm which points were input by keyboard 26.

The feature value, which was calculated in auto tuning D section 13, and the assessment points are then stored in the change data storage device 24 (step S46). Steps S43 to S46 are then repeated until the number of test run times specified at the step S47 (Lmax) is reached.

Figure 20:
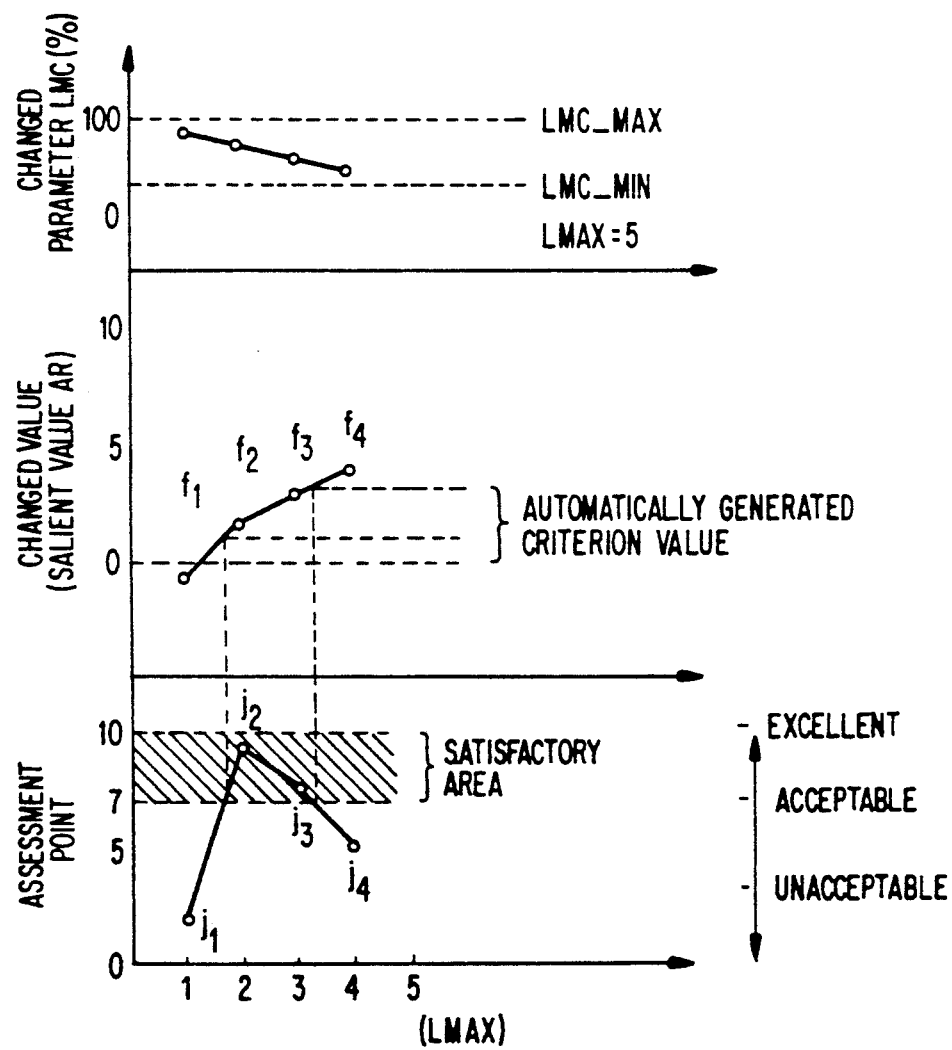
FIG. 20 illustrates a resulting feature value.

When the number of test run times has reached Lmax, the test run is terminated and the stored feature values and assessment points which were stored at change data storage device 24 are read (step S48). A test run number k at which the assessment point changes from a satisfactory area to an unsatisfactory area is retrieved. This number k can be retrieved by an equation shown at S49. As shown in FIG. 20, j1 is in the unsatisfactory area and j2 is in the satisfactory area. The feature value or salient value ΔR corresponding to an intersection point of a line connecting the two points and the boundary line of the satisfactory area is calculated and its maximum value is employed as a new criterion value. The calculation is indicated at step S50. This new criterion value, which was generated at the criterion change section 23 or 23b, is stored in the new criterion storage device 22 or 22b and the process is then terminated (step S50.1).

While the maximum and minimum values set in the automatic tuning program have been employed as a control parameter range in the above description, the operator may set from the keyboard a narrower area within the range of maximum and minimum values or a test run may first be made roughly using the maximum and minimum values set to the automatic tuning program as mentioned previously. A control parameter range close to the satisfactory area can then be set as the maximum and minimum values, and microadjustment can be made.

A method of determining the feature value of a control parameter where a single parameter has multiple tuning conditions will now be described. In the adjustment of the lost motion compensation for compensating for the discontinuous orbit at the quadrant switching time in the circular orbit shown in FIG. 18, for example, the feature value or salient value ΔR changes according to a feedrate if the control parameter is identical. In this case, the feature value must be operated on by changing the tuning condition or feedrate. Comprehensive judgment must be made by weighting, i.e., emphasizing the feature values where the feedrate of the machine is low or high.

A multiple tuning condition will now be described in accordance with a flow chart shown in FIG. 21.

TABLE 3

| Type (i)     | 1   | 2     | 3     |
|--------------|-----|-------|-------|
| Feedrate (F) | 300 | 1,000 | 3,000 |
| Radius (R)   | 150 | 150   | 150   |

A comprehensive multiple tuning condition judgment program is first started, three types of feedrate F are set as indicated in Table 3, the number of test run times is set to three times, and the control parameter condition types employed are defined in an initial condition setting step (step S51).

Figure 22:
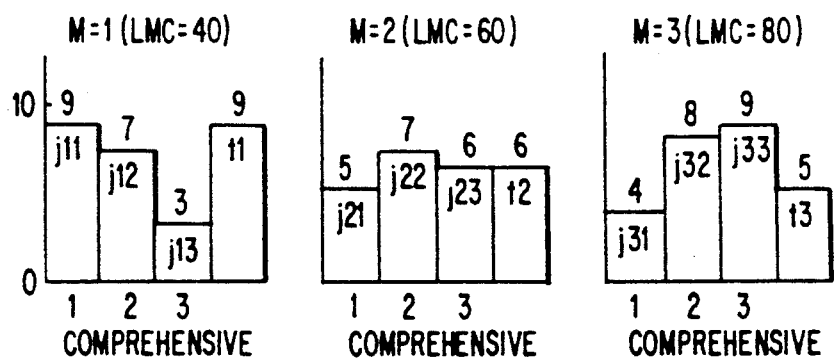
FIG. 22 illustrates the feature values that are displayed after being calculated under all conditions.

The subprogram S25 in FIG. 4 is then called, and the feature value or salient value ΔR is calculated for each of the three types of conditions (steps S25, S52, S53). After the feature values under all conditions have been calculated, the feature values are displayed as described in the section of the criterion changing process (step S54), and the assessment point is assigned to the feature value under each condition as illustrated in FIG. 22, e.g. a certain point is assigned as a comprehensive point because low-speed accuracy is emphasized in this machine (step S55). Further, the above steps are repeated for the number of initialized control parameter types (steps S57 and S58). The control parameter, feature values, feature value assessment points and comprehensive point are then stored in the change data storage device 24 or 24b (Step S56).

A weight factor indicating the significance of each tuning condition is calculated at criterion change section 23 and at step S59. Equations 1 to 4 provide examples of equations used to calculate the weight factor. Equation 1

$$J = [jmi] = \begin{bmatrix} 973 \\ 576 \\ 489 \end{bmatrix} \quad (1)$$

individual assessment level matrix is an assessment point matrix, wherein the assessment point jmi with respect to each tuning condition in each test run has been matrixed. Similarly, in equation 2, $$T = [tm] = \begin{bmatrix} 9 \\ 5 \\ 4 \end{bmatrix} \quad (2)$$

comprehensive assessment level matrix the comprehensive assessment point tm has been matrixed. The assessment point matrix and comprehensive point matrix can be represented by equation 3

$$[Tm]=[jmi][wi] \quad (3)$$

wi: weight coeffient of each condition
using the weight factor matrix wherein the weight factor of each tuning condition has been matrixed. Hence, the weight factor matrix can be found by employing equation 4:

$$[wi]=[jmi]^{-1}[tm] \quad (4)$$

At step S60, an FJ curve indicating correlation between the feature value f and the assessment point j under each tuning condition is found. Suppose, for example, that test run data shown in Table 4 has been obtained:

TABLE 4

| m | LMC | Salient value (f) | Assessment point | Weighted assessment point (j) |
|---|-----|-------------------|------------------|-------------------------------|
| 1 | 40  | 2                 | 9                | 9/10 × wi                     |

TABLE 4-continued

| m | LMC | Salient value (f) | Assessment point | Weighted assessment point (j) |
|---|---|---|---|---|
| 2 | 60 | 4 | 5 | 5/10 × wi |
| 3 | 80 | 5 | 4 | 4/10 × wi |

Figure 23:
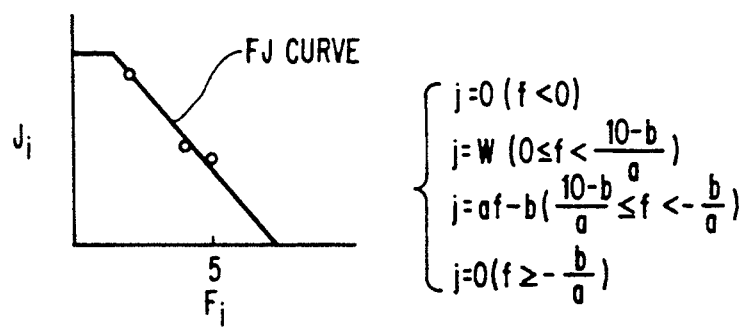
FIG. 23 illustrates the feature value f plotted on the horizontal and vertical axes.
Figure 24:
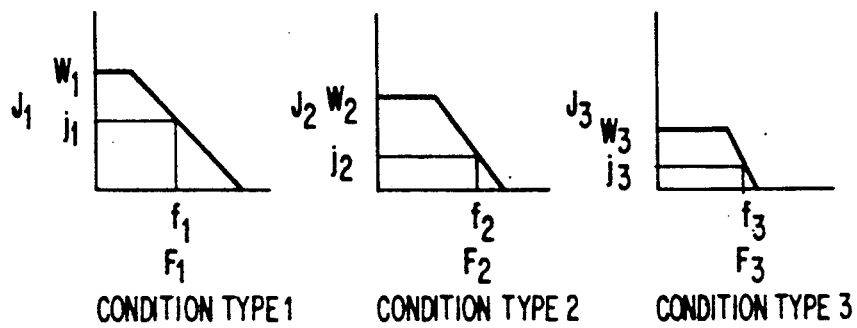
FIG. 24 illustrates the FJ curve indicated by a polygon.

A weighted assessment point in this table indicates the assessment point jmi entered plus the weight factor under each tuning condition found at the step S59. This result is illustrated in FIG. 23 which has been provided by plotting the feature value f in the horizontal axis and the weighted assessment point j in the vertical axis. The FJ curve is approximate to polygons, as shown in FIG. 24 illustrating such data, and polygon equations can be calculated using equation 5:

$$a = \frac{\sum_{m=2}^{N} \left( \frac{j1 - jm}{f1 - fm} \right)}{N - 1} \tag{5}$$

$N$: number of data ($N = 3$)

$b = j_1 - af_1$

The FJ curve, indicated by the polygon as shown in FIG. 24, may instead be represented by an arbitrary multi-degree equation, and each factor can be found by utilizing the approximation method of least squares or the like.

Finally the FJ curve found under each tuning condition is registered into the new criterion storage 22 or 22b at step S61, and the comprehensive multiple-tuning condition judgement program is terminated.

Figure 21:
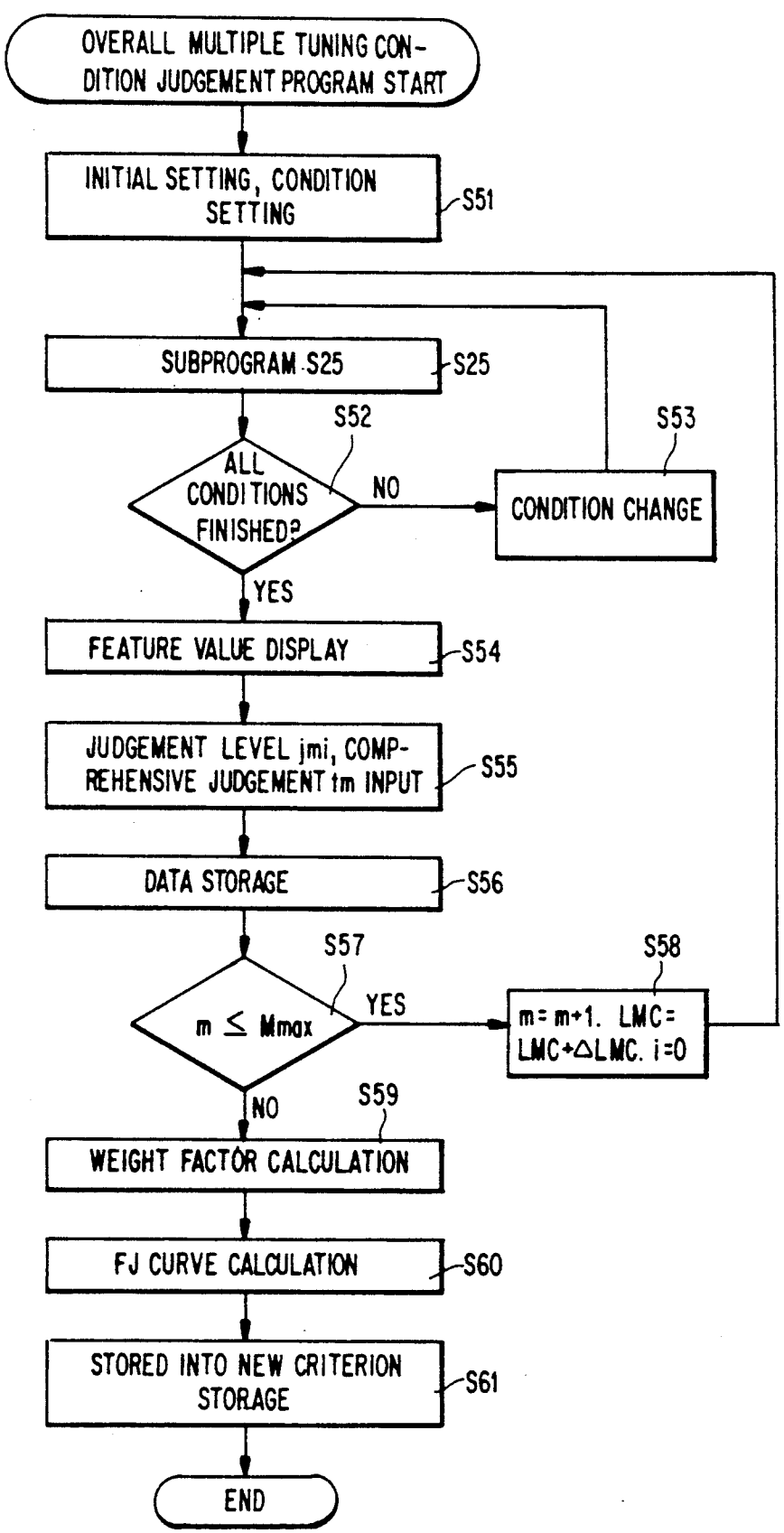
FIG. 21 is a flow chart illustrating a multiple tuning condition.
Figure 25:
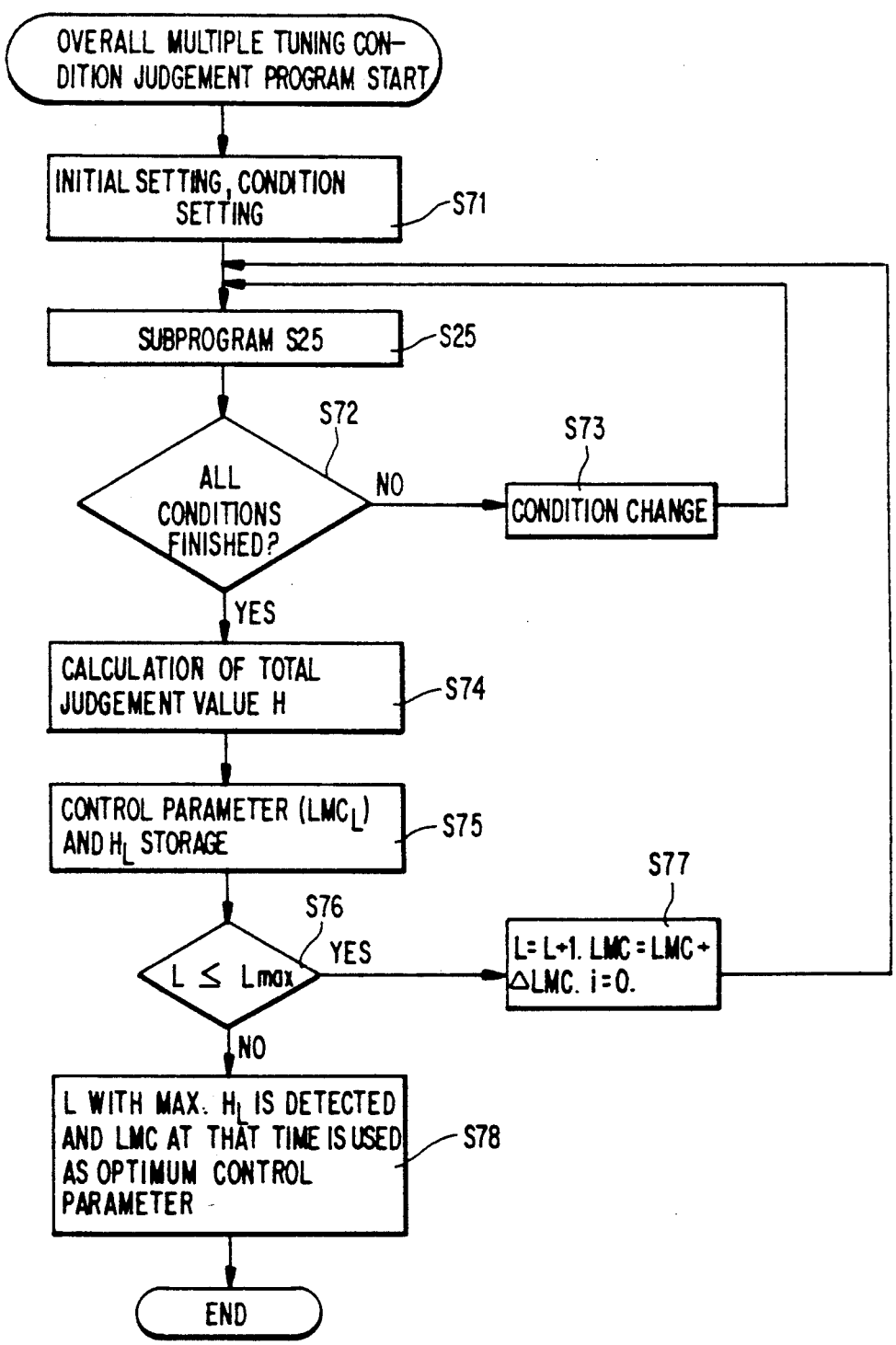
FIG. 25 is a flow chart illustrating the process of calculating the weight factors and the FJ curves by taking advantage of the feature value under each tuning condition.
Figure 26:
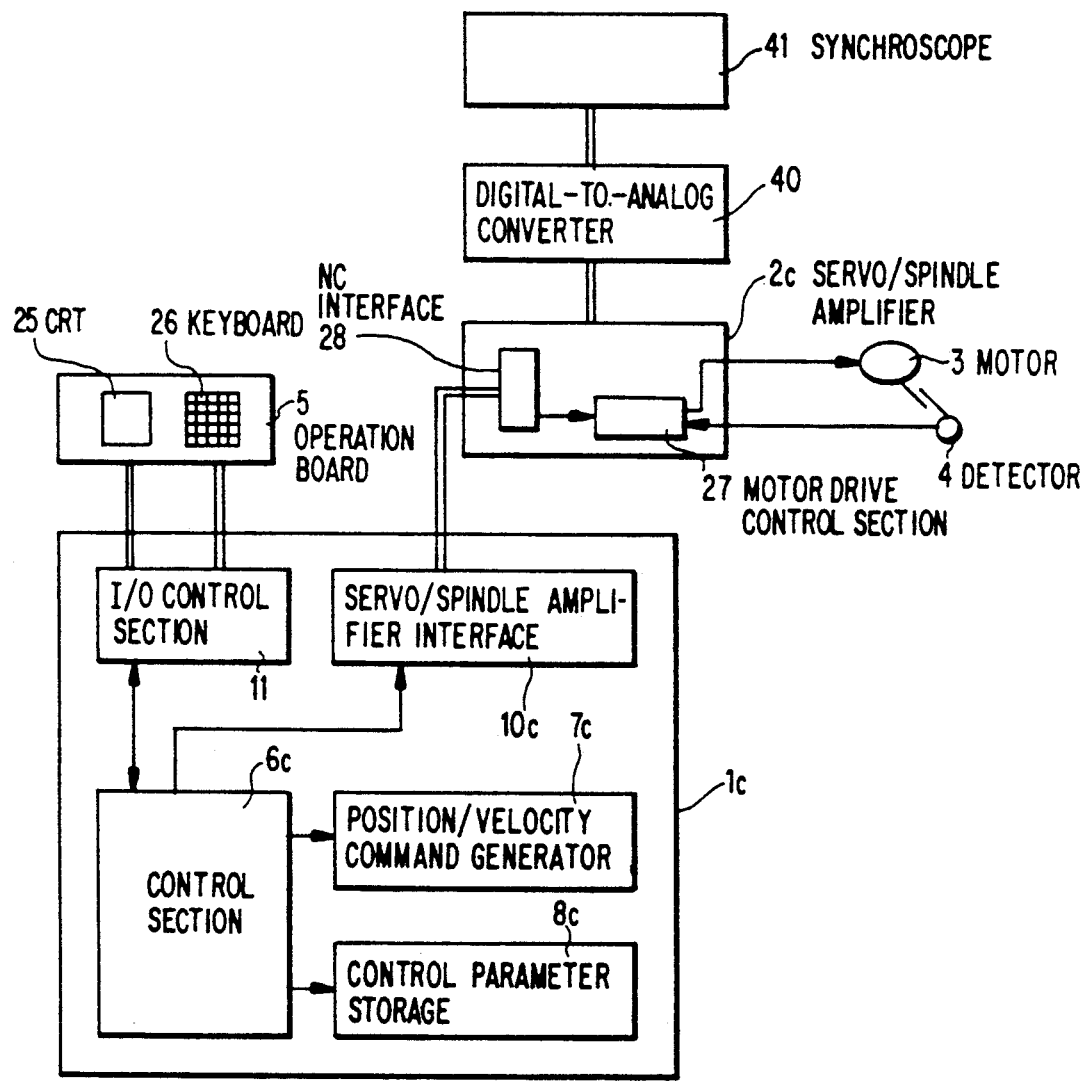
FIG. 26 is a function block diagram of a prior art numerical control unit and a servo or spindle motor drive system, illustrating how the control parameters of the servo (spindle), motor drive system are tuned.
Figure 27:
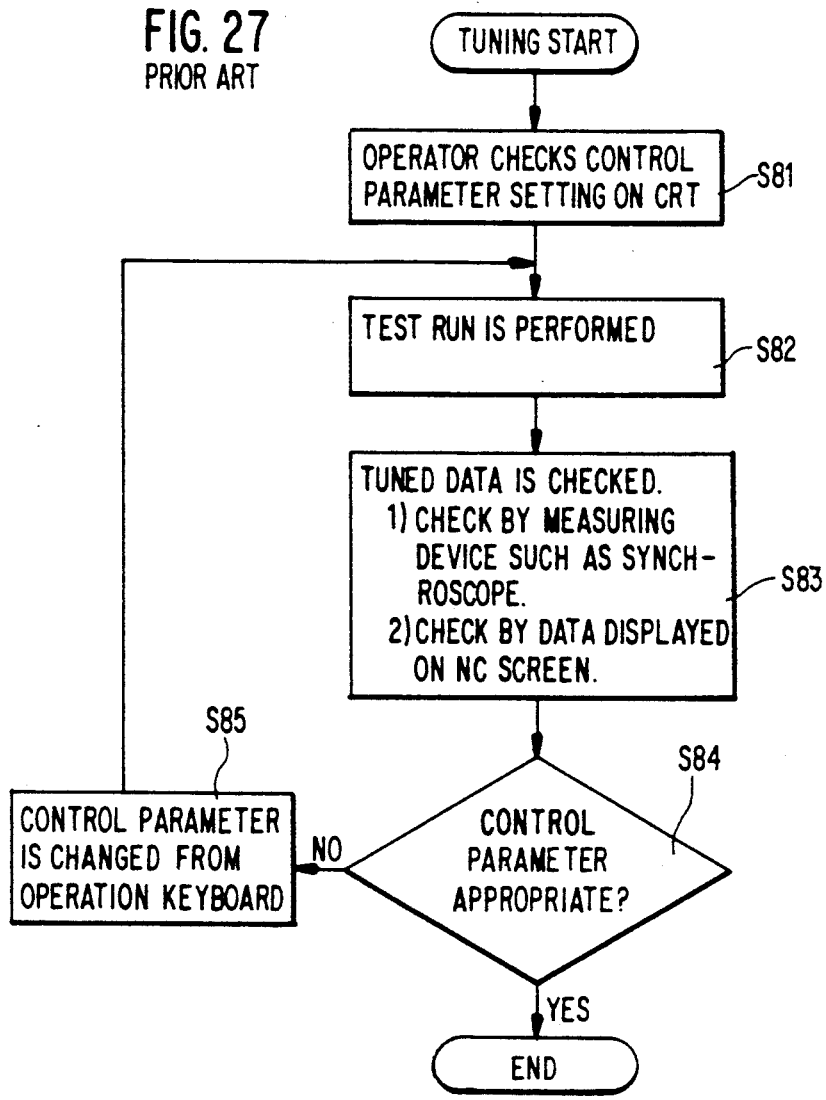
FIG. 27 is a flow chart illustrating a procedure wherein an operator tunes the control parameters employing the prior art numerical control unit.
Figure 28A:
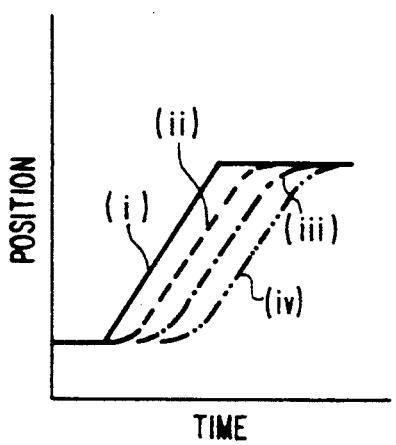
FIGS. 28(a) and 28(b) show a position command, its response, and a synchroscope waveform in the known tuning process.
Figure 28B:
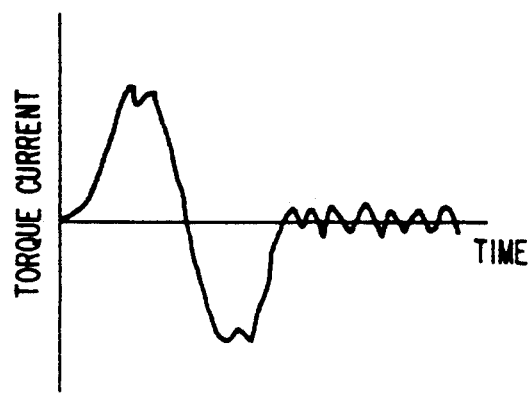

Whereas the machine is actually driven to collect the test run data in the flowchart illustrated in FIG. 21, the weight factors and FJ curves may be calculated by taking advantage of the feature value under each tuning condition prepared beforehand without the machine being driven. FIG. 25 shows a flowchart of automatic tuning corresponding to multiple tuning conditions with weight factors and FJ curves obtained by the above method.

Step S71 is a stage of making initial setting, such as the setting of an initial value LMCO, a change width ΔLMC, and a new number of times Lmax of the control parameter, and of setting the tuning conditions as indicated in Table 5:

TABLE 5

| Machine type | A | B | C | |
|---|---|---|---|---|
| Feature | High speed | High accuracy | High speed, high accuracy | |
| Condition F: Feedrate | 3,000 | 500 | 3,000 | 500 |
| tion R: Radius | 150 | 100 | 150 | 150 |
| Required accuracy (salient value) | Within +5 μm | Within +2 μm | Within +5 μm | Within +3 μm |
| Automatic tuning result | +3 μm | +3 μm | +3 μm (+7 μm) | (+4 μm) +2 μm |
| Assessment | Good | Insufficient | Satisfies each condition individually. Already tuned but does not satisfy both. Insufficient. | |

Note:
The value in parentheses indicates a salient value for operation under one of the conditions at a time when automatic tuning is made under the above conditions.

Test run, data sampling and feature value calculation (step S25) are performed under all the tuning conditions set at the step S71. Step S72 is a stage of determining whether the test run has been made under all the tuning conditions and step S73 is a tuning condition changing stage for the test run programs.

At step S74 the feature value fi calculated under each tuning condition in step S25 is assigned to the FiJi curve, finding corresponding ji values, adding all the assessment points, and calculating a total judgment value H.

At step S75 resultant total judgment values H and control parameter (LMC in this case) values are stored, and it is determined whether the total judgment value H has been found the number of times defined at the initial setting (step S76).

If the number of set times has not yet been reached at step S76, the control parameter is changed and a new parameter is transferred to the servo amplifier (step S77), and the steps starting at S25 are repeated. If the total judgment value H has been found the number of set times at the step S76, the control parameter with the maximum total judgment value H is retrieved at step S78 and registered into the new criterion storage 22 or 22b as an optimum control parameter, and the process is terminated.

It will be apparent that the present invention allows the control parameters of a servo spindle on a machine tool and the like to be tuned automatically by a numerical control unit and easily added, changed at a later time, or both. A control parameter can also be automatically tuned by an external computer linked with a numerical control unit for easy addition or changing at a later time. The present invention also allows each tuning condition to be weighed and further allows a comprehensive assessment required for a machine to be made where a single parameter has multiple tuning conditions whereby the machine can provide the maximum performance. In addition, the present invention allows the criterion value for the feature values of the control parameter set in the program by a manufacturer to be automatically changed and the criterion to be changed between machines.

What is claimed is:

1. Apparatus for automatically tuning and setting control parameters, comprising:
   automatic tuning means for automatically tuning control parameters of a servo or a spindle, said automatic tuning means including measuring means for measuring status value data of the servo or spindle indicative of its condition;
   a data sampling control section for controlling setting and storage of the measured status value data as sampling data;
   a plurality of automatic tuning programs and test run programs associated with the control parameters, wherein said tuning programs select said test run programs;
   an automatic tuning system control section for selecting an automatic tuning program corresponding to a setting of a control parameter to be tuned; and
   an automatic tuning control section for controlling the servo or spindle according to a test run program selected by said automatic tuning program, and for changing the sampling data into a desired control parameter based on said sampling data.

2. The apparatus, as defined in claim 1, further comprising control parameter storing means for storing a tuning history of the automatically tuned control parameters.

3. The apparatus, as defined in claim 1, further comprising:
    manual tuning means for allowing the control parameters of the servo or the spindle to be tuned manually; and
    switching means for switching between the manual tuning means and the automatic tuning means.

4. A method of comprehensively determining feature values of a control parameter having multiple tuning conditions, comprising the steps of:
    1) setting the multiple tuning conditions and operating on and storing the feature values under all the tuning conditions set;
    2) displaying the stored feature values on displaying means;
    3) weighting the feature values displayed;
    4) comprehensively assessing all the tuning conditions from all the feature values of said tuning conditions; and
    5) comprehensively judging the feature values of the control parameter from said comprehensive assessment result.

5. A method of automatically tuning control parameters of a servo or a spindle by means of a numerical control unit or computer linked with the numerical control unit, the method comprising the steps of:
    1) activating an automatic tuning mode;
    2) selecting a control parameter to be automatically tuned via an inputting means;
    3) automatically selecting and starting an automatic tuning and a test run program associated with the control parameter selected;
    4) test-running the servo or the spindle according to the test run program started, and fetching sampling data from the servo or spindle;
    5) operating on a feature value from the sampling data fetched and judging whether the control parameter is appropriate or not from the feature value operated on; and
    6) changing a set value of the control parameter and repeating steps 4) and 5) if the control parameter is judged as inappropriate.

6. A method of sampling data for a numerical control unit equipped with an automatic tuning function for tuning control parameters of a servo or spindle controlled by the numerical control unit, the method comprising the steps of:
    1) setting as a base time a time when a value of sampling data crosses a predetermined trigger level in a predetermined direction in order to determine that the sampling data has been fetched and that the fetching thereof should be terminated;
    2) setting respective predetermined time durations before and after the base time;
    3) setting as a sampling period an arbitrary time duration from the time preceding the base time of one of the predetermined time durations to the time following the base time of the other of the predetermined time durations;
    4) fetching the sampling data at the time duration step; and
    5) storing the sampling data fetched.

7. A method of changing a criterion value for feature values employed by a numerical control unit to determine whether a control parameter set to be tuned is appropriate or not, the method comprising the steps of:
    1) setting a plurality of control parameters in a changed range;
    2) test-running a servo or spindle by means of automatic tuning programs with the plurality of control parameters set, fetching sampling data, and storing the plurality of control parameters and the feature values;
    3) relating the plurality of control parameters and the feature values stored and displaying the relationships on a displaying means;
    4) weighting the feature values displayed; and
    5) setting a new range of criterion values for the feature values according to the relationships between said displayed control parameters, said feature values, and said feature values weighted.

8. Apparatus for automatically tuning and setting control parameters, comprising
    automatic tuning means for automatically tuning control parameters of a servo or a spindle controlled by a numerical control unit, said automatic tuning means including measuring means for measuring status value data of said servo or spindle;
    a data sampling control section for controlling setting and storage of said measured status value data as sampling data;
    a sampling data storage means for storing the sampling data;
    a control section for test-running the servo or spindle;
    a transmitting link to an external computer for transmitting the sampling data read in accordance with the control of said data sampling control section;
    a plurality of automatic tuning programs and test run programs associated with said control parameters, wherein said tuning programs select said test run programs; and
    a system control section for selecting an automatic tuning program corresponding to a setting of a control parameter to be tuned,
    wherein a numerical control unit includes an automatic tuning control section for test-running the servo or spindle according to a test run program selected by the automatic tuning program and is connected to an external computer, and wherein the external computer changes the sampling data transmitted from the numerical control unit into a desired control parameter by operating on the sampling data.

9. The apparatus, as defined in claim 8, further comprising control parameter storing means for storing a tuning history of the automatically tuned control parameters.

10. The numerical control unit, as defined in claim 8, further comprising:
    manual tuning means for allowing the control parameters of the servo or the spindle to be tuned manually; and
    switching means for switching between the manual tuning means and the automatic tuning means.

* * * * *